United States Patent
Moulon et al.

(10) Patent No.: US 11,164,361 B2
(45) Date of Patent: Nov. 2, 2021

(54) GENERATING FLOOR MAPS FOR BUILDINGS FROM AUTOMATED ANALYSIS OF VISUAL DATA OF THE BUILDINGS' INTERIORS

(71) Applicant: Zillow Group, Inc., Seattle, WA (US)

(72) Inventors: Pierre Moulon, Seattle, WA (US); Ivaylo Boyadzhiev, Seattle, WA (US)

(73) Assignee: Zillow, Inc., Seattle, WA (US)

(*) Notice: Subject to any disclaimer, the term of this patent is extended or adjusted under 35 U.S.C. 154(b) by 0 days.

(21) Appl. No.: 17/080,604

(22) Filed: Oct. 26, 2020

(65) Prior Publication Data

US 2021/0125397 A1 Apr. 29, 2021

Related U.S. Application Data

(60) Provisional application No. 62/927,032, filed on Oct. 28, 2019.

(51) Int. Cl.
*G06T 15/10* (2011.01)
*H04N 5/232* (2006.01)
(Continued)

(52) U.S. Cl.
CPC .......... *G06T 15/10* (2013.01); *G06T 7/55* (2017.01); *G06T 7/73* (2017.01); *H04N 5/23238* (2013.01); *G06T 2207/10016* (2013.01)

(58) Field of Classification Search
None
See application file for complete search history.

(56) References Cited

U.S. PATENT DOCUMENTS 5,140,352 A  8/1992 Moore et al.
6,031,540 A  2/2000 Golin et al.
(Continued)

FOREIGN PATENT DOCUMENTS

EP  2413097 A2  2/2012
EP  2505961 A2  10/2012
(Continued)

OTHER PUBLICATIONS

CubiCasa | From video to floor plan in under 5 minutes, retrieved on Mar. 26, 2019, from https://www.cubi.casa/, 6 pages.
(Continued)

*Primary Examiner* — Frank S Chen
(74) *Attorney, Agent, or Firm* — VLP Law Group LLP; James A. D. White

(57) ABSTRACT

Techniques are described for using computing devices to perform automated operations for analyzing video (or other image sequences) acquired in a defined area, as part of generating mapping information of the defined area for subsequent use (e.g., for controlling navigation of devices, for display on client devices in corresponding GUIs, etc.). The defined area may include an interior of a multi-room building, and the generated information may include a floor map of the building, such as from an analysis of some or all image frames of the video (e.g., 360° image frames from 360° video) using structure-from-motion techniques to identify objects with associated plane and normal orthogonal information, and then clustering detected planes and/or normals from multiple analyzed images to determine likely wall locations. The generating may be further performed without using acquired depth information about distances from the video capture locations to objects in the surrounding building.

31 Claims, 15 Drawing Sheets

(51) Int. Cl.
*G06T 7/55* (2017.01)
*G06T 7/73* (2017.01)

(56) References Cited

U.S. PATENT DOCUMENTS

| | | | |
|---|---|---|---|
| 6,141,034 A | 10/2000 | McCutchen | |
| 6,317,166 B1 | 11/2001 | McCutchen | |
| 6,320,584 B1 | 11/2001 | Golin et al. | |
| 6,323,858 B1 | 11/2001 | Gilbert et al. | |
| 6,337,683 B1 | 1/2002 | Gilbert et al. | |
| 6,654,019 B2 | 11/2003 | Gilbert et al. | |
| 6,683,608 B2 | 1/2004 | Golin et al. | |
| 6,690,374 B2 | 2/2004 | Park et al. | |
| 6,731,305 B1 | 5/2004 | Park et al. | |
| 6,738,073 B2 | 5/2004 | Park et al. | |
| 7,050,085 B1 | 5/2006 | Park et al. | |
| 7,129,971 B2 | 10/2006 | McCutchen | |
| 7,196,722 B2 | 3/2007 | White et al. | |
| 7,525,567 B2 | 4/2009 | McCutchen | |
| 7,620,909 B2 | 11/2009 | Park et al. | |
| 7,627,235 B2 | 12/2009 | McCutchen et al. | |
| 7,782,319 B2 | 8/2010 | Ghosh et al. | |
| 7,791,638 B2 | 9/2010 | McCutchen | |
| 7,909,241 B2 | 3/2011 | Stone et al. | |
| 7,973,838 B2 | 7/2011 | McCutchen | |
| 8,072,455 B2 | 12/2011 | Temesvari et al. | |
| 8,094,182 B2 | 1/2012 | Park et al. | |
| RE43,786 E | 11/2012 | Cooper | |
| 8,463,020 B1 | 6/2013 | Schuckmann et al. | |
| 8,517,256 B2 | 8/2013 | Stone et al. | |
| 8,520,060 B2 | 8/2013 | Zomet et al. | |
| 8,523,066 B2 | 9/2013 | Stone et al. | |
| 8,523,067 B2 | 9/2013 | Stone et al. | |
| 8,528,816 B2 | 9/2013 | Stone et al. | |
| 8,540,153 B2 | 9/2013 | Stone et al. | |
| 8,594,428 B2 | 11/2013 | Aharoni et al. | |
| 8,654,180 B2 | 2/2014 | Zomet et al. | |
| 8,699,005 B2 | 4/2014 | Likholyot | |
| 8,705,892 B2 | 4/2014 | Aguilera et al. | |
| RE44,924 E | 6/2014 | Cooper et al. | |
| 8,854,684 B2 | 10/2014 | Zomet | |
| 8,861,840 B2 | 10/2014 | Bell et al. | |
| 8,861,841 B2 | 10/2014 | Bell et al. | |
| 8,879,828 B2 | 11/2014 | Bell et al. | |
| 8,953,871 B2 | 2/2015 | Zomet | |
| 8,989,440 B2 | 3/2015 | Klusza et al. | |
| 8,996,336 B2 | 3/2015 | Malka et al. | |
| 9,021,947 B2 | 5/2015 | Landa | |
| 9,035,968 B2 | 5/2015 | Zomet | |
| 9,041,796 B2 | 5/2015 | Malka et al. | |
| 9,071,714 B2 | 6/2015 | Zomet | |
| 9,129,438 B2 | 9/2015 | Aarts et al. | |
| 9,151,608 B2 | 10/2015 | Malka et al. | |
| 9,165,410 B1 | 10/2015 | Bell et al. | |
| 9,171,405 B1 | 10/2015 | Bell et al. | |
| 9,324,190 B2 | 4/2016 | Bell et al. | |
| 9,361,717 B2 | 6/2016 | Zomet | |
| 9,396,586 B2 | 7/2016 | Bell et al. | |
| 9,438,759 B2 | 9/2016 | Zomet | |
| 9,438,775 B2 | 9/2016 | Powers et al. | |
| 9,489,775 B1 | 11/2016 | Bell et al. | |
| 9,495,783 B1 | 11/2016 | Samarasekera et al. | |
| 9,576,401 B2 | 2/2017 | Zomet | |
| 9,619,933 B2 | 4/2017 | Spinella-Marno et al. | |
| 9,635,252 B2 | 4/2017 | Accardo et al. | |
| 9,641,702 B2 | 5/2017 | Bin-Nun et al. | |
| 9,760,994 B1 | 9/2017 | Bell et al. | |
| 9,786,097 B2 | 10/2017 | Bell et al. | |
| 9,787,904 B2 | 10/2017 | Birkler et al. | |
| 9,836,885 B1 | 12/2017 | Eraker et al. | |
| 9,852,351 B2 | 12/2017 | Aguilera Perez et al. | |
| 9,953,111 B2 | 4/2018 | Bell et al. | |
| 9,953,430 B1 | 4/2018 | Zakhor | |
| 9,990,760 B2 | 6/2018 | Aguilera Perez et al. | |
| 9,990,767 B1 | 6/2018 | Sheffield et al. | |
| 10,026,224 B2 | 7/2018 | Bell et al. | |
| 10,030,979 B2 | 7/2018 | Bjorke et al. | |
| 10,055,876 B2 | 8/2018 | Ford et al. | |
| 10,068,344 B2 | 9/2018 | Jovanovic et al. | |
| 10,083,522 B2 | 9/2018 | Jovanovic et al. | |
| 10,102,639 B2 | 10/2018 | Bell et al. | |
| 10,102,673 B2 | 10/2018 | Eraker et al. | |
| 10,120,397 B1 | 11/2018 | Zakhor et al. | |
| 10,122,997 B1 | 11/2018 | Sheffield et al. | |
| 10,127,718 B2 | 11/2018 | Zakhor et al. | |
| 10,127,722 B2 | 11/2018 | Shakib et al. | |
| 10,139,985 B2 | 11/2018 | Mildrew et al. | |
| 10,163,261 B2 | 12/2018 | Bell et al. | |
| 10,163,271 B1 | 12/2018 | Powers et al. | |
| 10,181,215 B2 | 1/2019 | Sedeffow | |
| 10,192,115 B1 | 1/2019 | Sheffield et al. | |
| 10,204,185 B2 | 2/2019 | Mrowca et al. | |
| 10,210,285 B2 | 2/2019 | Wong et al. | |
| 10,235,797 B1 | 3/2019 | Sheffield et al. | |
| 10,242,400 B1 | 3/2019 | Eraker et al. | |
| 10,339,716 B1 | 7/2019 | Powers et al. | |
| 10,366,531 B2 | 7/2019 | Sheffield | |
| 10,395,435 B2 | 8/2019 | Powers et al. | |
| 2006/0256109 A1 | 11/2006 | Acker et al. | |
| 2010/0232709 A1 | 9/2010 | Zhang et al. | |
| 2012/0075414 A1 | 3/2012 | Park et al. | |
| 2012/0293613 A1 | 11/2012 | Powers et al. | |
| 2013/0050407 A1 | 2/2013 | Brinda et al. | |
| 2013/0147961 A1* | 6/2013 | Gao | G08B 13/1968 348/159 |
| 2013/0342533 A1 | 12/2013 | Bell et al. | |
| 2014/0043436 A1 | 2/2014 | Bell et al. | |
| 2014/0044343 A1 | 2/2014 | Bell et al. | |
| 2014/0044344 A1 | 2/2014 | Bell et al. | |
| 2014/0125658 A1 | 5/2014 | Bell et al. | |
| 2014/0125767 A1 | 5/2014 | Bell et al. | |
| 2014/0125768 A1 | 5/2014 | Bell et al. | |
| 2014/0125769 A1 | 5/2014 | Bell et al. | |
| 2014/0125770 A1 | 5/2014 | Bell et al. | |
| 2014/0236482 A1 | 8/2014 | Dorum et al. | |
| 2014/0267631 A1 | 9/2014 | Powers et al. | |
| 2014/0307100 A1 | 10/2014 | Myllykoski et al. | |
| 2015/0109338 A1* | 4/2015 | McKinnon | G06F 16/50 345/633 |
| 2015/0116691 A1 | 4/2015 | Likholyot | |
| 2015/0189165 A1 | 7/2015 | Milosevski et al. | |
| 2015/0262421 A1 | 9/2015 | Bell et al. | |
| 2015/0269785 A1 | 9/2015 | Bell et al. | |
| 2015/0302636 A1 | 10/2015 | Arnoldus et al. | |
| 2015/0310596 A1 | 10/2015 | Sheridan et al. | |
| 2015/0332464 A1 | 11/2015 | O'Keefe et al. | |
| 2016/0055268 A1 | 2/2016 | Bell et al. | |
| 2016/0134860 A1 | 5/2016 | Jovanovic et al. | |
| 2016/0140676 A1 | 5/2016 | Fritze et al. | |
| 2016/0217225 A1 | 7/2016 | Bell et al. | |
| 2016/0260250 A1 | 9/2016 | Jovanovic et al. | |
| 2016/0286119 A1 | 9/2016 | Rondinelli | |
| 2016/0300385 A1 | 10/2016 | Bell et al. | |
| 2017/0034430 A1 | 2/2017 | Fu et al. | |
| 2017/0067739 A1 | 3/2017 | Siercks et al. | |
| 2017/0194768 A1 | 7/2017 | Powers et al. | |
| 2017/0195654 A1 | 7/2017 | Powers et al. | |
| 2017/0263050 A1 | 9/2017 | Ha et al. | |
| 2017/0324941 A1 | 11/2017 | Birkler | |
| 2017/0330273 A1 | 11/2017 | Holt et al. | |
| 2017/0337737 A1 | 11/2017 | Edwards et al. | |
| 2018/0025536 A1 | 1/2018 | Bell et al. | |
| 2018/0075168 A1 | 3/2018 | Tiwari et al. | |
| 2018/0101803 A1* | 4/2018 | Tiwari | G06Q 10/06 |
| 2018/0139431 A1 | 5/2018 | Simek et al. | |
| 2018/0143023 A1 | 5/2018 | Bjorke et al. | |
| 2018/0143756 A1 | 5/2018 | Mildrew et al. | |
| 2018/0144487 A1 | 5/2018 | Bell et al. | |
| 2018/0144535 A1 | 5/2018 | Ford et al. | |
| 2018/0144547 A1 | 5/2018 | Shakib et al. | |
| 2018/0144555 A1 | 5/2018 | Ford et al. | |
| 2018/0146121 A1 | 5/2018 | Hensler et al. | |
| 2018/0146193 A1 | 5/2018 | Safreed et al. | |
| 2018/0146212 A1 | 5/2018 | Hensler et al. | |

(56) References Cited

U.S. PATENT DOCUMENTS

| | | | |
|---|---|---|---|
| 2018/0165871 | A1 | 6/2018 | Mrowca |
| 2018/0203955 | A1 | 7/2018 | Bell et al. |
| 2018/0241985 | A1 | 8/2018 | O'Keefe et al. |
| 2018/0293793 | A1 | 10/2018 | Bell et al. |
| 2018/0300936 | A1 | 10/2018 | Ford et al. |
| 2018/0306588 | A1 | 10/2018 | Bjorke et al. |
| 2018/0348854 | A1 | 12/2018 | Powers et al. |
| 2018/0365496 | A1 | 12/2018 | Hovden et al. |
| 2019/0012833 | A1 | 1/2019 | Eraker et al. |
| 2019/0026956 | A1 | 1/2019 | Gausebeck et al. |
| 2019/0026957 | A1 | 1/2019 | Gausebeck |
| 2019/0026958 | A1 | 1/2019 | Gausebeck et al. |
| 2019/0035165 | A1 | 1/2019 | Gausebeck |
| 2019/0041972 | A1 | 2/2019 | Bae |
| 2019/0050137 | A1 | 2/2019 | Mildrew et al. |
| 2019/0051050 | A1 | 2/2019 | Bell et al. |
| 2019/0051054 | A1 | 2/2019 | Jovanovic et al. |
| 2019/0087067 | A1 | 3/2019 | Hovden et al. |
| 2019/0122422 | A1 | 4/2019 | Sheffield et al. |
| 2019/0164335 | A1 | 5/2019 | Sheffield et al. |
| 2019/0180104 | A1 | 6/2019 | Sheffield et al. |
| 2019/0251645 | A1 | 8/2019 | Winans |
| 2019/0287164 | A1 | 9/2019 | Eraker et al. |
| 2019/0332114 | A1* | 10/2019 | Moroniti ............. G05D 1/0248 |

FOREIGN PATENT DOCUMENTS

| | | | |
|---|---|---|---|
| EP | 2506170 | A2 | 10/2012 |
| KR | 101770648 | B1 | 8/2017 |
| KR | 101930796 | B1 | 12/2018 |
| WO | 2005091894 | A2 | 10/2005 |
| WO | 2016154306 | A1 | 9/2016 |
| WO | 2018204279 | A1 | 11/2018 |
| WO | 2019083832 | A1 | 5/2019 |
| WO | 2019104049 | A1 | 5/2019 |
| WO | 2019118599 | A2 | 6/2019 |

OTHER PUBLICATIONS

CubiCasa FAQ & Manual, retrieved on Mar. 26, 2019, from https://www.cubi.casa/faq/, 5 pages.
Cupix Home, retrieved on Mar. 26, 2019, from https://www.cupix.com/, 1 page.
Cupix—FAQ, retrieved on Mar. 26, 2019, from https://www.cupix.com/faq.html, 3 pages.
IGuide: 3D Virtual Tours, retrieved on Mar. 26, 2019, from https://goiguide.com/, 6 pages.
Immoviewer.com | Automated Video Creation & Simple Affordable 3D 360 Tours, retrieved on Mar. 26, 2019, from https://www.immoviewer.com/, 5 pages.
MagicPlan | #1 Floor Plan App, Construction & Surveying Samples, retrieved on Mar. 26, 2019, from https://www.magicplan.app/, 9 pages.
EyeSpy360 Virtual Tours | Virtual Tour with any 360 camera, retrieved on Mar. 27, 2019, from https://www.eyespy360.com/en-us/, 15 pages.
Indoor Reality, retrieved on Mar. 27, 2019, from https://www.indoorreality.com/, 9 pages.
Insidemaps, retrieved on Mar. 27, 2019, from https://www.insidemaps.com/, 7 pages.
Staging | Augmented & Virtual Reality Platform for Business, retrieved on Mar. 27, 2019, from https://www.istaging.com/en/, 7 pages.
Metareal, retrieved on Mar. 27, 2019, from https://www.metareal.com/, 4 pages.
PLNAR—The AR 3D Measuring / Modeling Platform, retrieved on Mar. 27, 2019, from https://www.plnar.co, 6 pages.
YouVR Global, retrieved on Mar. 27, 2019, from https://global.youvr.io/, 9 pages.
GeoCV, retrieved on Mar. 28, 2019, from https://geocv.com/, 4 pages.
Biersdorfer, J.D., "How To Make a 3-D Model of Your Home Renovation Vision," in The New York Times, Feb. 13, 2019, retrieved Mar. 28, 2019, 6 pages.
Chen et al. "Rise of the indoor crowd: Reconstruction of building interior view via mobile crowdsourcing." In: Proceedings of the 13th ACM Conference on Embedded Networked Sensor Systems. Nov. 4, 2015, 13 pages.
Immersive 3D for the Real World, retrieved from https://matterport.com/, on Mar. 27, 2017, 5 pages.
Learn About Our Complete 3D System, retrieved from https://matterport.com/how-it-works/, on Mar. 27, 2017, 6 pages.
Surefield FAQ, retrieved from https://surefield.com/faq, on Mar. 27, 2017, 1 page.
Why Surefield, retrieved from https://surefield.com/why-surefield, on Mar. 27, 2017, 7 pages.
Schneider, V., "Create immersive photo experiences with Google Photo Sphere," retrieved from http://geojournalism.org/2015/02/create-immersive-photo-experiences-with-google-photo-sphere/, on Mar. 27, 2017, 7 pages.
Tango (platform), Wikipedia, retrieved from https://en.wikipedia.org/wiki/Tango_(platform), on Jun. 12, 2018, 5 pages.
Zou et al. "LayoutNet: Reconstructing the 3D Room Layout from a Single RGB Image" in arXiv:1803.08999, submitted Mar. 23, 2018, 9 pages.
Lee et al. "RoomNet: End-to-End Room Layout Estimation" in arXiv:1703.00241v2, submitted Aug. 7, 2017, 10 pages.
Time-of-flight camera, Wikipedia, retrieved from https://en.wikipedia.org/wiki/Time-of-flight_camera, on Aug. 30, 2018, 8 pages.
Magicplan—Android Apps on Go . . . , retrieved from https://play.google.com/store/apps/details?id=com.sensopia.magicplan, on Feb. 21, 2018, 5 pages.

* cited by examiner

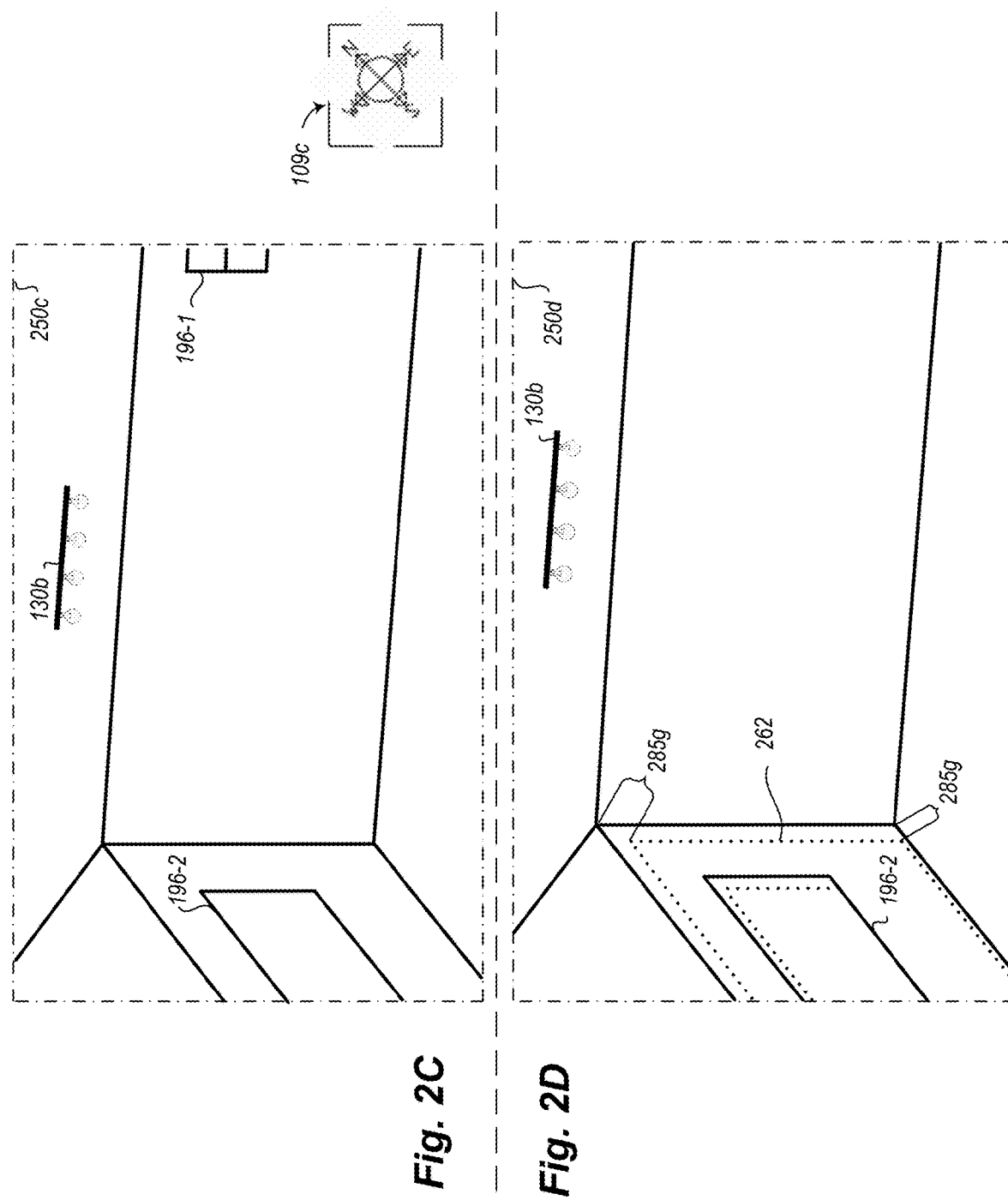

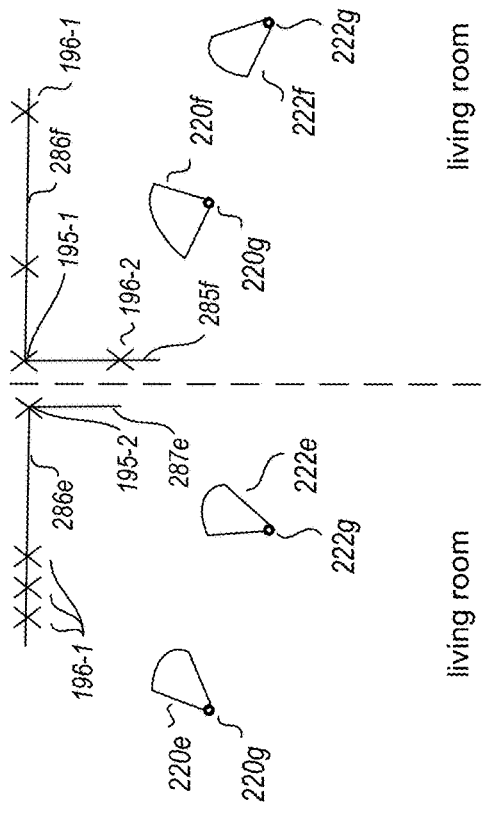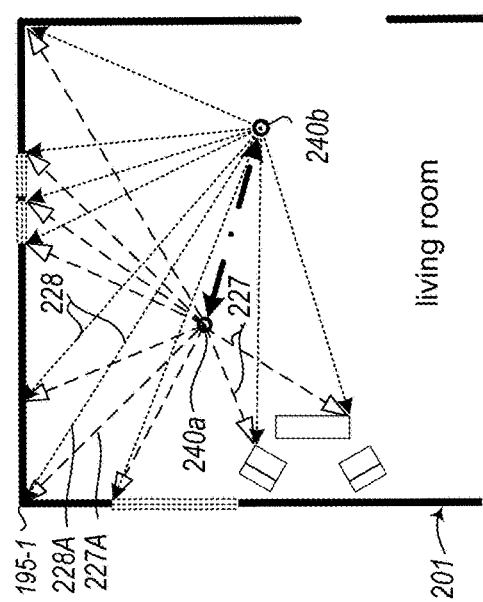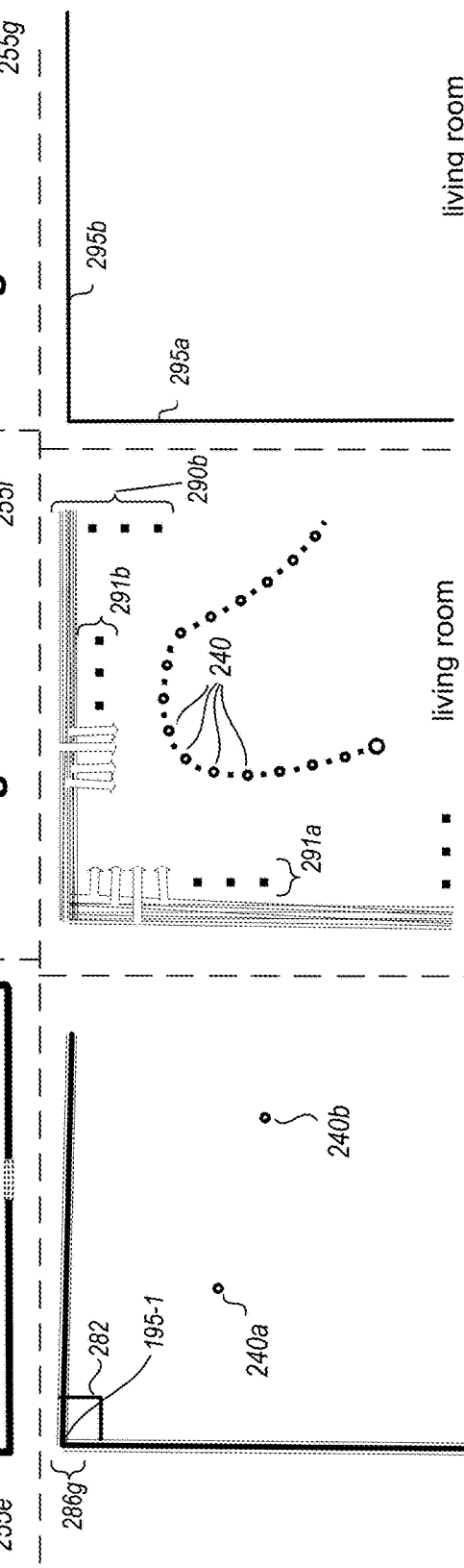
Fig. 2E Fig. 2F Fig. 2G
Fig. 2H Fig. 2I Fig. 2J

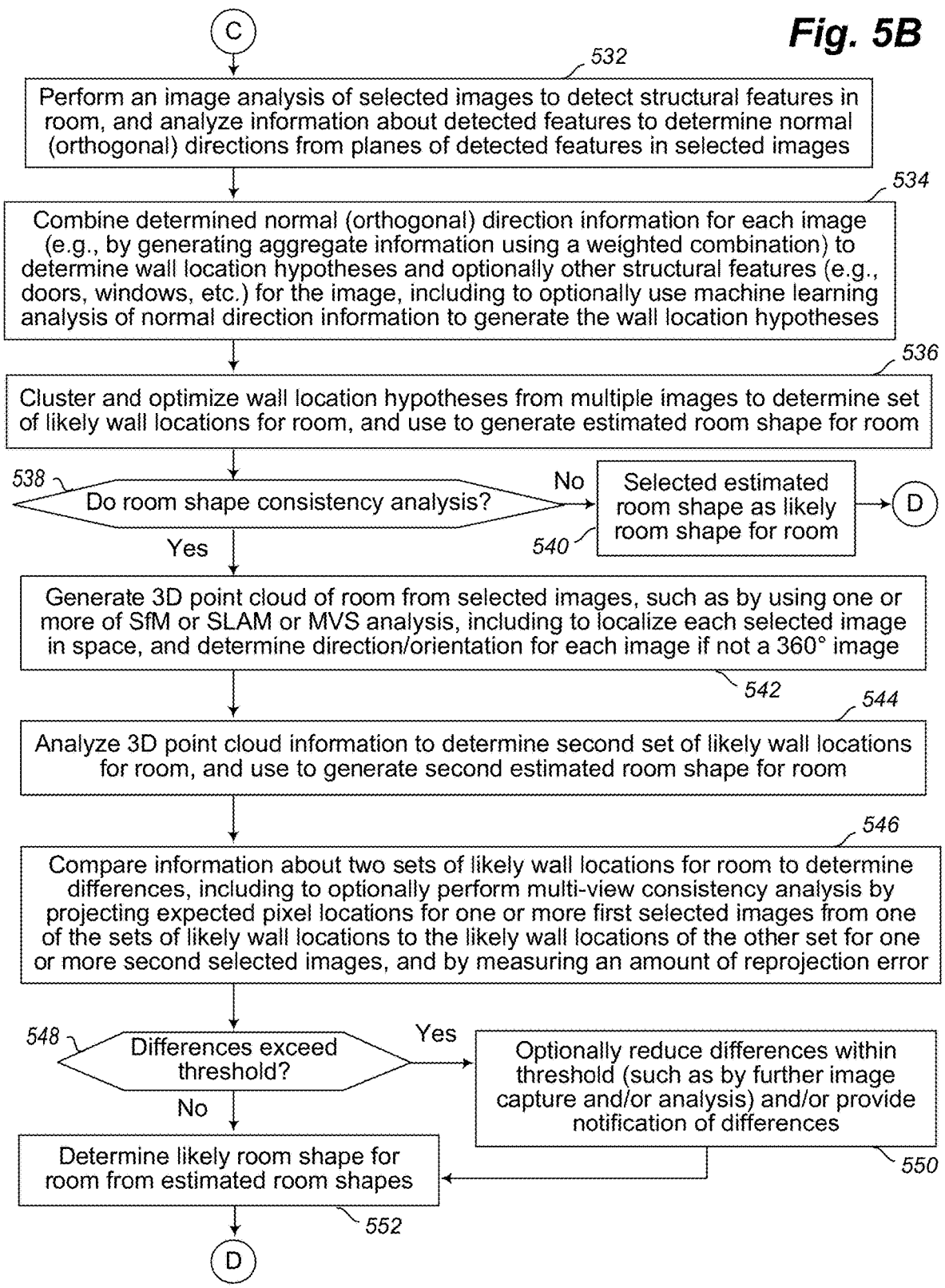

GENERATING FLOOR MAPS FOR BUILDINGS FROM AUTOMATED ANALYSIS OF VISUAL DATA OF THE BUILDINGS' INTERIORS

CROSS REFERENCE TO RELATED APPLICATIONS

This application claims the benefit of U.S. Provisional Patent Application No. 62/927,032, filed Oct. 28, 2019 and entitled "Generating Floor Maps For Buildings From Automated Analysis Of Video Of The Buildings' Interiors," which is hereby incorporated by reference in its entirety.

TECHNICAL FIELD

The following disclosure relates generally to techniques for automatically generating mapping information for a defined area using video or related visual image sequences acquired of the area, and for subsequently using the generated mapping information in one or more manners, such as to automatically generate a floor map of a building from analysis of video captured in the building's interior.

BACKGROUND

In various fields and circumstances, such as architectural analysis, property inspection, real estate acquisition and development, remodeling and improvement services, general contracting and other circumstances, it may be desirable to view information about the interior of a house, office, or other building without having to physically travel to and enter the building, including to determine actual as-built information about the building rather than design information from before the building is constructed. However, it can be difficult or impossible to effectively display visual information about building interiors to users at remote locations, such as to enable a user to fully understand the layout and other details of the interior.

BRIEF DESCRIPTION OF THE DRAWINGS

FIGS. 5A-5B illustrate an example embodiment of a flow diagram for a Visual data-To-Floor Map (VTFM) system routine in accordance with an embodiment of the present disclosure.

DETAILED DESCRIPTION

Figure 1A:
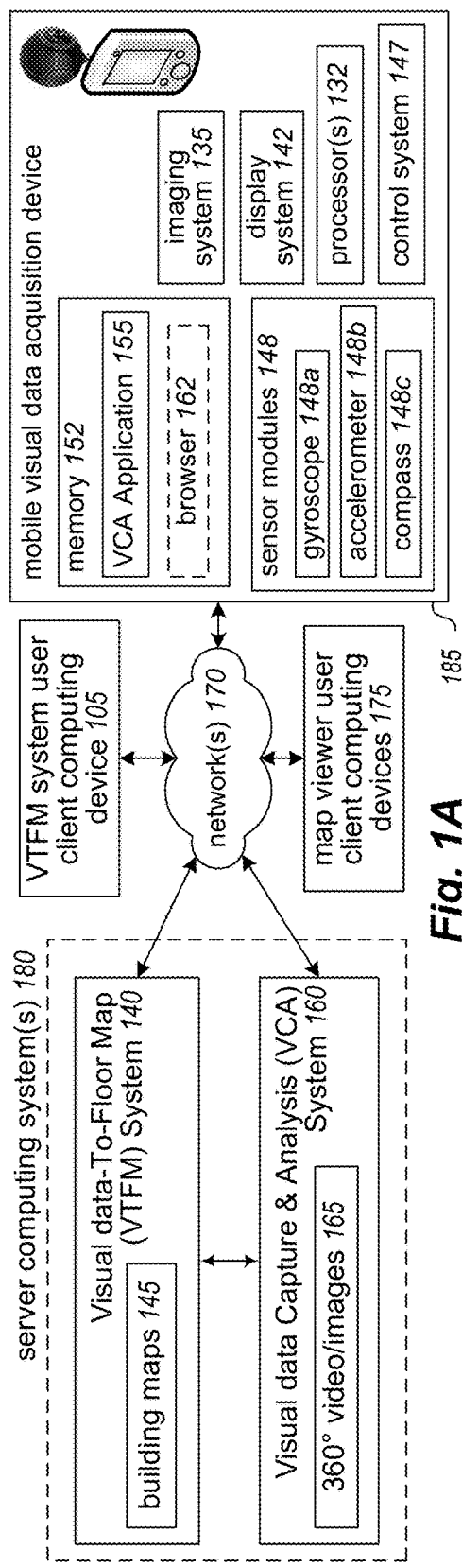
FIGS. 1A-1B are diagrams depicting an exemplary building interior environment and computing system(s) for use in embodiments of the present disclosure, such as for performing automated operations to generate mapping information representing the building interior.

The present disclosure describes techniques for using one or more computing devices to perform automated operations related to analyzing video acquired along a path through a defined area, as part of generating mapping information of the defined area for subsequent use in one or more further automated manners, or instead analyzing other types of image sequences along such a path followed by similar generating of mapping information. In at least some embodiments, the defined area includes an interior of a multi-room building (e.g., a house, office, etc.), and the generated information includes a 3D (three-dimensional) floor map model of the building that is generated from an analysis of image frames of continuous video acquired along a path through the interior of the building, with the image analysis identifying shapes and sizes of objects in the building interior (e.g., doors, windows, walls, etc.), as well as determining borders between walls, floors and ceilings. The captured video may, for example, be 360° video (e.g., video with frames that are each a spherical panorama image having 360° of coverage along at least one plane, such as 360° of coverage along a horizontal plane and around a vertical axis) acquired using a video acquisition device with a spherical camera having one or more fisheye lenses to capture 360 degrees horizontally, and in at least some such embodiments, the generating of the mapping information is further performed without having or using information acquired from any depth-sensing equipment about distances from the acquisition locations of the video/images to walls or other objects in the surrounding building interior. In addition, in at least some embodiments, the mapping-related information generated from the analysis of the video image frames (or other sequence of images) includes a 2D (two-dimensional) floor map of the building, such as an overhead view (e.g., an orthographic top view) of a schematic floor map, but without including or displaying height information in the same manner as visualizations of the 3D floor map model—if the 3D floor map model is generated first based on three-dimensional information obtained from the image analysis, such a 2D floor map may, for example, be generated from the 3D floor map model by removing height-related information for the rooms of the building. The generated 3D floor map model and/or 2D floor map and/or other generated mapping-related information may be further used in one or more manners in various embodiments, such as for controlling navigation of mobile devices (e.g., autonomous vehicles), for display on one or more client devices in corresponding GUIs (graphical user interfaces), etc. Additional details are included below regarding the automated operations of the computing device(s) involved in the generating of the mapping information, and some or all of the techniques described herein may, in at least some embodiments, be performed via automated operations of a Visual data-To-Floor Map ("VTFM") system, as discussed further below.

In at least some embodiments, the automated operations of the VTFM system may include selecting, from one or more videos captured of at least the interior of a building (e.g., along a path through the multiple rooms of a house or other multi-room building), video frames to include in an image group with a sequence of multiple images to use in the automated analysis and determination of a floor map (and optionally other mapping related information) for the building—in other embodiments in which another type of sequence of images of a building's interior are available that are not video frames (e.g., with each image having an acquisition location that is separated by only small distances from acquisition location(s) of one or more neighboring images, such as 3 feet or less, or 6 feet or less), similar automated techniques may be used to select an image group with a sequence of some or all of those images to use in the automated analysis and determination of the mapping related information for the building. The selection of the sequence of video frames or other images to use in the image group may be performed in various manners in various embodiments, including to select all available frames/images or instead to select only a subset of the available frames/images, such as frames/images that satisfy one or more defined criteria (e.g., a defined quantity or percentage of the frames/images; frames/images acquired at acquisition locations and/or in acquisition directions/orientations that differ from that of one or more neighboring frames/images in the group by at most a defined maximum distance or direction/orientation and/or that differ from that of one or more neighboring frames/images in the group by at least a defined minimum distance or direction/orientation; frames/images that satisfy other criteria, such as with respect to lighting and/or blur; etc.). At least some frames/images may further have associated acquisition metadata (e.g., one or more of acquisition time; acquisition location, such as GPS coordinates or other indication of location; acquisition direction and/or orientation; etc.), including data acquired from IMU (inertial measurement unit) sensors or other sensors of the acquisition device, and such acquisition metadata may further optionally be used as part of the frame/image selection process in at least some embodiments and situations.

In at least some such embodiments, some or all of the available frames or other images for selection in an image group may be 360° panorama images with 360° of horizontal coverage, but in at least some of those embodiments with less than 360° of vertical coverage (or other panorama images with a width exceeding a height by more than a typical aspect ratio, such as more than 16:9 or 3:2 or 7:5 or 4:3 or 5:4 or 1:1)—it will be appreciated that a user viewing such a panorama image may be permitted to move the viewing direction within the panorama image to different orientations to cause different subset images (or "views") to be rendered within the panorama image, and that such a panorama image may in some situations be represented in a spherical coordinate system (including, if the panorama image is represented in a spherical coordinate system and particular view is being rendered, to convert the image being rendered into a planar coordinate system, such as for a perspective image view before it is displayed). In situations involving such a panorama image, a corresponding image selected for the image group may be the entire such panorama image or instead a portion of it (e.g., a portion fitting a defined size and/or aspect ratio, in a defined direction and/or orientation, etc.). Thus, as used subsequently herein, the 'images' selected for the image group may be video frames and/or still images, and may be 360° images and/or other panorama images with less than 360° of coverage and/or non-panorama perspective images in a defined direction and/or orientation (including a subset 'view' of a panorama image in a particular viewing direction). Additional details are included below regarding automated operations of device(s) implementing a Visual data Capture and Analysis (VCA) system involved in acquiring images and optionally acquisition metadata.

The automated operations of the VTFM system may, in at least some embodiments, further include analyzing images from the image group to determine a 3D shape of each room in the building, such as to reflect the geometry of the surrounding structural elements of the building. For example, the images from the image group that are acquired within a particular room may be analyzed to determine features visible in the content of multiple such images in order to determine various information for the room, such as to determine the direction and/or orientation of the acquisition device when it took particular images, a path through the room traveled by the acquisition device, etc.—in at least some such embodiments, the analysis of the images may be performed using one or more of simultaneous localization and mapping (SLAM) techniques and/or other structure-from-motion (SfM) techniques, multiple-view stereovision (MVS) techniques, etc., such as to 'register' the camera positions for the images in a common frame of reference so as to 'align' the images, and to estimate 3D locations and shapes of objects in the room. As one non-exclusive example, if the images from the image group are not video frames but are instead a 'dense' set of images that are separated by at most a defined distance (e.g., 6 feet), SfM analysis techniques may be used to generate a 3D point cloud for each of one or more rooms in which those images were acquired, with the 3D point cloud(s) representing a 3D shape of each of the room(s) and including 3D points along walls of the room and at least some of the ceiling and floor of the room, and optionally with 3D points corresponding to other objects in the room(s), if any. As another non-exclusive example, if the images from the image group are video frames from a video acquired in one or more rooms, SLAM and/or SfM techniques may be used to generate a 3D point cloud for each of the room(s), with the 3D point cloud(s) representing a 3D shape of each of the room(s) and including 3D points along walls of the room and at least some of the ceiling and floor of the room, and optionally with 3D points corresponding to other objects in the room(s), if any. As part of the analysis of the images in a room, the automated operations of the VTFM system further include determining planes for detected features and normal (orthogonal) directions to those planes—it will be appreciated that while some such plane and normal information may correspond to objects in the room that are not part of the building structure (e.g., furniture in the center of the room), many or most or all (if there are not any such objects) of the determined planes and normals will correspond to walls of the room. The VTFM system then aggregates such plane and normal information across multiple images from the image group in the room, and clusters similar planes and/or similar normals (e.g., those that differ from each other in location and angle by at most a maximum distance and degree, or other distance measure) to form hypotheses of likely wall locations (and optionally of other likely locations, such as for the floor and/or ceiling of the room)—as part of doing so, machine learning techniques may be used in at least some embodiments to predict which aggregated plane/normal information corresponds to flat walls, such as based on prior training. After likely wall locations are determined, the VTFM system may further apply constraints of one or more types to connect the various likely wall locations and form an estimated room shape for the room, such as constraints that include 90° angles between walls and/or between walls and floor (e.g., as part of the so-called 'Manhattan world assumption' involving typical use of parallel and perpendicular surfaces in buildings), constraints to correspond to typical room shapes, etc.

In addition to identifying wall locations, the automated analysis of images in a room by the VTFM system may further include identifying other types of features in the room in at least some embodiments, such as one or more of the following: corners where at least three surfaces meet; borders between adjacent walls; borders between walls and a floor; borders between walls and a ceiling; windows and/or sky-lights; passages into and/or out of the room, such as doorways and other openings in walls, stairs, hallways, etc.; other structures, such as countertops, bath tubs, sinks, fireplaces, and furniture; etc.—if so, at least some such features (e.g., corners and borders) may further be used as part of the automated room shape determination (e.g., as constraints to connect likely wall locations), while other such features (e.g., doorways or other passages) may be used to assist in connecting multiple room shapes together, and yet other such features (e.g., windows, bath tubs, sinks, etc.) may have corresponding information included in the resulting generated floor map or other mapping related information. In some embodiments, the identification of doorways and/or other inter-room passages may include using machine learning analysis of object-related information generated from the image analysis (e.g., from an SfM, MVS and/or SLAM analysis), while in other embodiments the identification of doorways and/or other inter-room passages may be performed in other manners (e.g., by detecting where the identified path of the mobile acquisition device during the video capture passes through planar surfaces identified as likely walls). The automated analysis of the images may identify at least some such features based at least in part on identifying different content within the passages than outside them (e.g., different colors, shading, etc.), identifying their outlines, etc. In addition, in at least some embodiments, the automated analysis of the images may further identify additional information, such as an estimated room type (whether based on shape and/or other features identified in the room), dimensions of objects (e.g., objects of known size), etc., which may be further used during generation of a floor map and/or other mapping related information as discussed further below. Additional details are included below regarding automated operations to determine room shapes and other room information based on analysis of images from the room, including with respect to FIGS. 2A-2J.

In addition, when analysis of the images from the image group provide a 3D point cloud or other 3D representation of a shape of a room, such information may further be used in at least some embodiments together with the information about the room shape that is generated from the analysis of normal and planar information, such as to assess consistency between the different types of determined room shape information. For example, the locations of walls of the room may be estimated from analysis of a 3D point cloud or other 3D representation of the room shape, and used together with the hypothesized likely wall locations from the analysis of normal and planar information, such as for one or more of the following: to combine the two sets of wall location information to automatically determine a final likely wall location (e.g., to do a weighted average); to compare the two sets of wall location information to determine if errors between them exceed a defined threshold, such as by performing a multi-view consistency analysis involving projecting pixel data from the hypothesized wall locations from one image of the image group in the room to the hypothesized wall locations from another image of the image group in the room (e.g., an immediately preceding or subsequent image in the image group) and measuring an amount of reprojection error, and/or by directly comparing the two sets of wall location information for one or more images to determine if they differ by more than a defined amount (e.g., a defined percentage, a defined linear amount, a defined rotational amount, etc.), and if the determined error exceeds the defined threshold to optionally provide a notification or initiate other activity (e.g., to prompt further data gathering for the room and/or analysis of likely room wall locations, such as to analyze additional images that are not part of the image group); etc.

After determining the estimated room shapes of the rooms in the building, the automated operations of the VTFM system may, in at least some embodiments, further include positioning the multiple room shapes together to form a floor map and/or other related mapping information for the building, such as by connecting the various room shapes. The positioning of the multiple room shapes may include, for example, automatically determining initial placement positions of each room's estimated room shape relative to each other by connecting identified passages between rooms (e.g., to co-locate or otherwise match connecting passage information in two or more rooms that the passage connects), and optionally further applying constraints of one or more types (e.g., that walls of two side-by-side rooms should be parallel and optionally separated by a distance corresponding to an estimated or default thickness of a wall between the rooms, or by otherwise matching shapes of the rooms; by fitting some or all of the room shapes within an exterior shape of some or all of the building, if available; by preventing room shapes from being placed in external locations corresponding to the building exterior, if available, or otherwise positioned where rooms should not be located; by using overall dimensions of the building and/or of particular rooms in the building, if available; etc.) to reach final placement positions for use in the resulting floor map (e.g., to determine relative global positions of the associated room shapes to each other in a common coordinate system or other common frame of reference, such as without knowing the actual measurements of the rooms). In situations with a building having multiple stories or otherwise having multiple levels, the connecting passage information may further be used to associate corresponding portions on different sub-maps of different floors or levels. In addition, if distance scaling information is available for one or more of the images, corresponding distance measurements may be determined, such as to allow room sizes and other distances to be determined and further used for the generated floor map. Additional details are included below regarding automatically determining position placements of the rooms' estimated room shapes relative to each other, including with respect to FIGS. 2K-2O.

In some embodiments, one or more types of additional processing may be further performed, such as to determine additional mapping-related information for a generated floor map or to otherwise associate additional information with a generated floor map. As one example, one or more types of additional information about a building may be received and associated with the floor map (e.g., with particular locations in the floor map), such as additional images, textual and/or audio annotations or other descriptions of particular rooms or other locations, other audio information, such as recordings of ambient noise; overall dimension information, etc. As previously noted, in at least some embodiments, additional processing of images is performed to determine features of one or more types in rooms (e.g., windows, fireplaces, appliances, bath tubs, showers, sinks, etc.), and may be associated with corresponding locations in the floor map, stored and optionally displayed. As another example, in at least some embodiments, additional processing of images is performed to determine estimated distance information of one or more types, such as to measure sizes in images of objects of known size, and use such information to estimate room width, length and/or height dimensions. Such estimated size information for one or more rooms may be associated with the floor map, stored and optionally displayed—if the size information is generated for all rooms within a sufficient degree of accuracy, a more detailed floor map of the building may further be generated, such as with sufficient detail to allow blueprints or other architectural plans to be generated. In addition, if estimated size information includes height information (e.g., from floors to ceilings, such as may be obtained from results of SfM and/or MVS and/or SLAM processing), a 3D model (e.g., with full height information represented) and/or 2.5D (two-and-a-half dimensional) model (e.g., with partial representations of height shown) of some or all of the 2D (two-dimensional) floor map may be created (optionally with information from in-room images projected on the walls of the models), associated with the floor map, stored and optionally displayed. Other types of additional information may be generated or retrieved and used in some embodiments, such as to determine a geographical alignment (e.g., with respect to true north or magnetic north) for a building and/or geographical location (e.g., with respect to latitude and longitude, or GPS coordinates) for a building, and to optionally include corresponding information on its generated floor map and/or other generated mapping-related information, and/or to optionally further align the floor map or other generated mapping-related information with other associated external information (e.g., satellite or other external images of the building, including street-level images to provide a 'street view' of the building; information for an area in which the building is located, such as nearby street maps and/or points of interest; etc.). Other information about the building may also be retrieved from, for example, one or more external sources (e.g., online databases, 'crowd-sourced' information provided by one or more end users, etc.), and associated with and linked to the floor map and/or to particular locations within the floor map—such additional information may further include, for example, exterior dimensions and/or shape of the building, additional images and/or annotation information acquired corresponding to particular locations within the building (optionally for locations different from viewing locations of the acquired panorama or other images), etc. Such generated floor maps and optionally additional associated information may further be used in various manners, as discussed elsewhere herein.

The described techniques provide various benefits in various embodiments, including to allow floor maps of multi-room buildings and other structures to be generated from videos (or other sequences of images) acquired in the buildings or other structures via automated operations of one or more computing systems, which may provide a particularly rapid process if 360° continuous video or other images are acquired as a capture device is moved through the building, and including doing so without having or using detailed information about distances from images' viewing locations to walls or other objects in a surrounding building or other structure. Furthermore, such automated techniques allow such a floor map to be generated much more quickly than previously existing techniques, and in at least some embodiments with greater accuracy, based at least in part on using information acquired from the actual building environment (rather than from plans on how the building should theoretically be constructed), as well as enabling the capture of changes to structural elements that occur after a building is initially constructed. In addition, in embodiments in which hypothesized wall location information is automatically generated for a room using multiple different techniques (e.g., from analysis of a 3D point cloud or other 3D representation of the room shape, such as generated by a SLAM and/or SfM analysis, and from the analysis of normal and planar information from images in the room) and is used together, the automatically generated wall location information may be determined with even greater degrees of accuracy and/or precision. Such described techniques further provide benefits in allowing improved automated navigation of a building by mobile devices (e.g., semi-autonomous or fully-autonomous vehicles), including to significantly reduce their computing power used and time used to attempt to otherwise learn a building's layout. In addition, in some embodiments the described techniques may be used to provide an improved GUI in which an end user may more accurately and quickly obtain information about a building's interior (e.g., for use in navigating that interior, such as via a virtual tour), including in response to search requests, as part of providing personalized information to the end user, as part of providing value estimates and/or other information about a building to an end user, etc. Various other benefits are also provided by the described techniques, some of which are further described elsewhere herein.

For illustrative purposes, some embodiments are described below in which specific types of information are acquired, used and/or presented in specific ways for specific types of structures and by using specific types of devices—however, it will be understood that the described techniques may be used in other manners in other embodiments, and that the invention is thus not limited to the exemplary details provided. As one non-exclusive example, while floor maps may be generated for houses that do not include detailed measurements for particular rooms or for the overall houses, it will be appreciated that other types of floor maps or other mapping information may be similarly generated in other embodiments, including for buildings (or other structures or layouts) separate from houses. As another non-exclusive example, while video data (e.g., 360° video) may be acquired and used to provide images for image groups in some embodiments, in other embodiments sequences of images may be acquired and used for such image groups in other manners in other embodiments (e.g., by repeatedly moving a camera to acquire still images, such as 360° panorama images, a short distance along a path through a building whose interior will be mapped, such as approximately or exactly every 1 foot or 3 feet or 6 feet or other distance). As yet another non-exclusive example, while floor maps for houses or other buildings may be used for display to assist viewers in navigating the buildings, generated mapping information may be used in other manners in other embodiments. In addition, the term "building" refers herein to any partially or fully enclosed structure, typically but not necessarily encompassing one or more rooms that visually or otherwise divide the interior space of the structure—non-limiting examples of such buildings include houses, apartment buildings or individual apartments therein, condominiums, office buildings, commercial buildings or other wholesale and retail structures (e.g., shopping malls, department stores, warehouses, etc.), etc. The term "acquire" or "capture" as used herein with reference to a building interior, viewing location, or other location (unless context clearly indicates otherwise) may refer to any recording, storage, or logging of media, sensor data, and/or other information related to spatial and/or visual characteristics of the building interior or subsets thereof, such as by a recording device or by another device that receives information from the recording device. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify similar elements or acts.

Figure 1B:
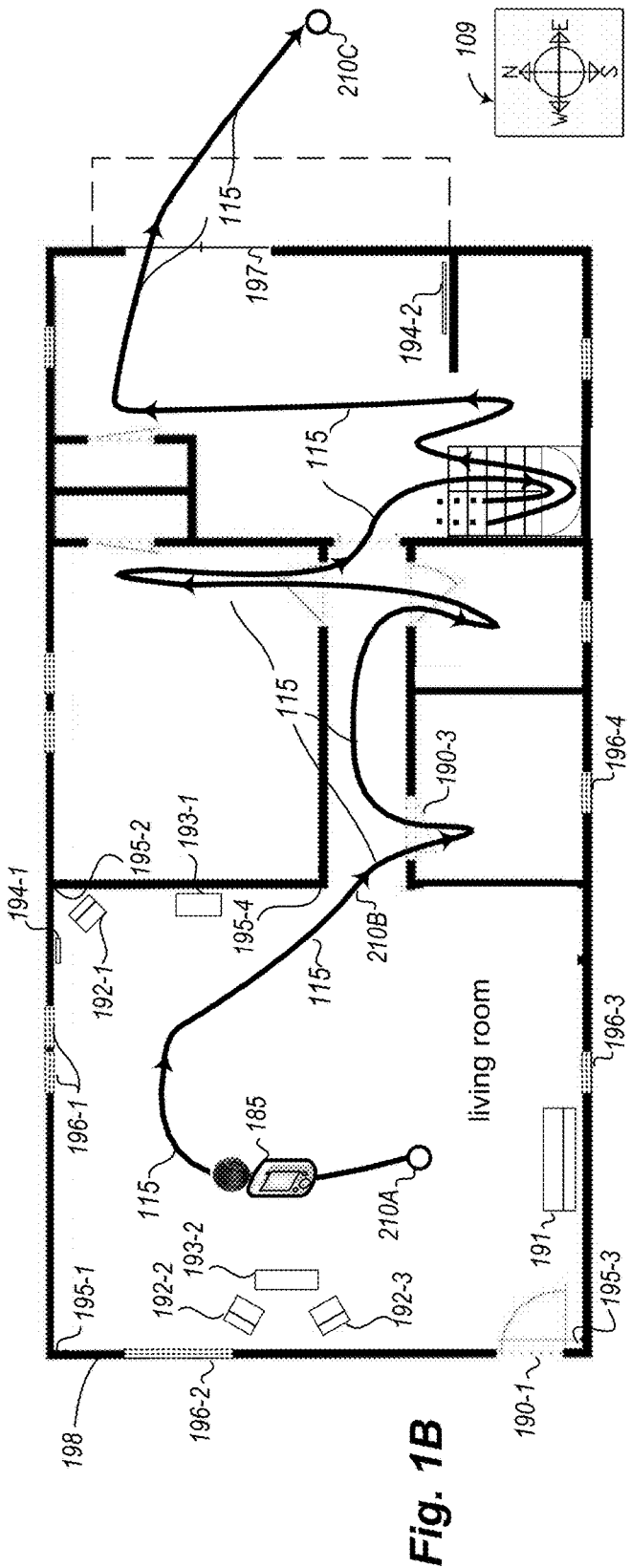
Figure 2A:
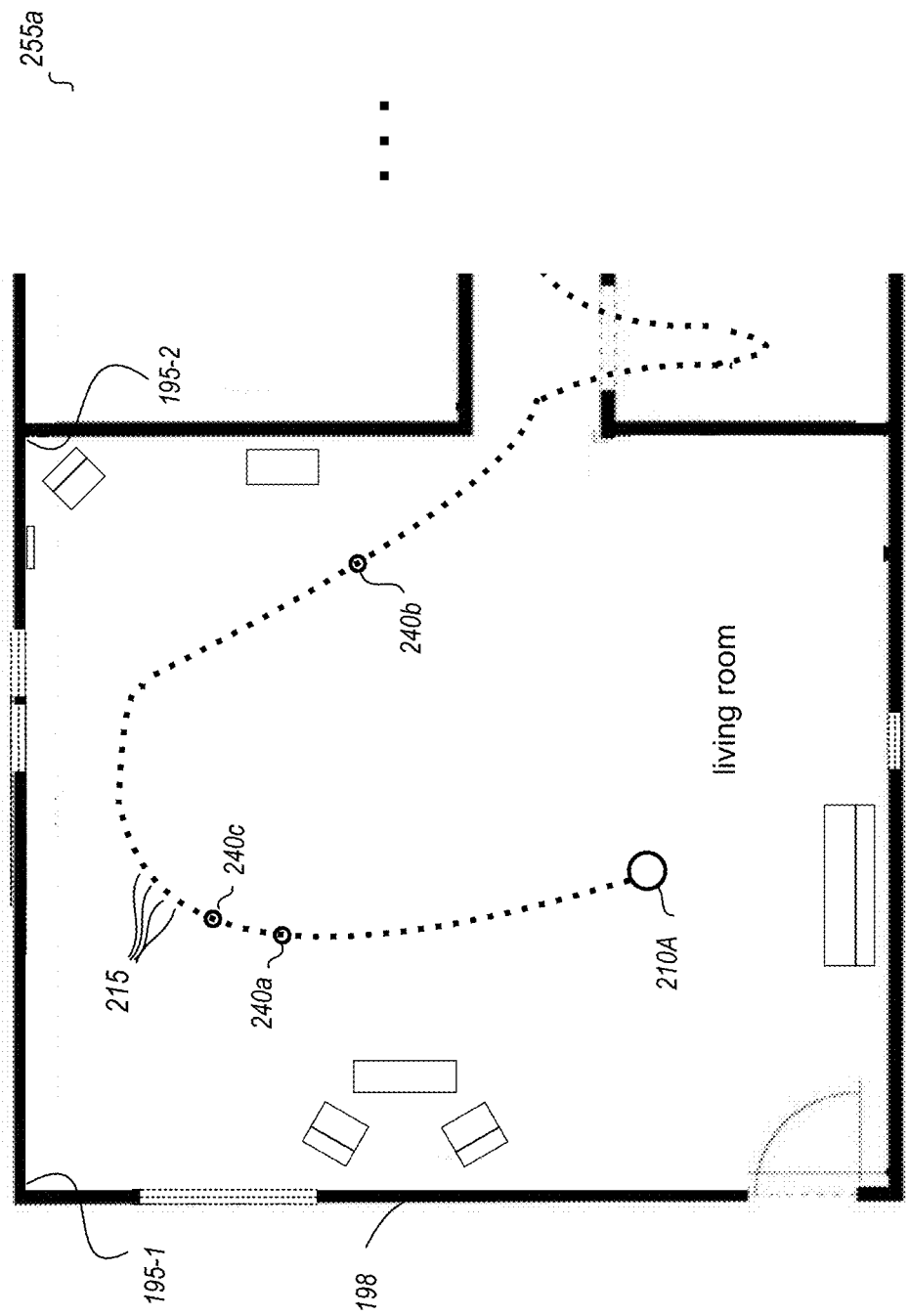
FIGS. 2A-2O illustrate examples of automated operations for analyzing video or other sequences of images from a building's interior and for generating a corresponding floor map for the building.

FIG. 1A is an example block diagram of various computing devices and systems that may participate in the described techniques in some embodiments. In particular, one or more 360° videos (or other sequences of 360° images) 165 have been generated by a Visual data Capture and Analysis ("VCA") system (e.g., a system 160 that is executing on one or more server computing systems 180, and/or a system provided by application 155 executing on one or more mobile visual data acquisition devices 185), such as with respect to one or more buildings or other structures—FIG. 1B shows one example of acquiring such a video for a particular house along a path 115 from starting location 210A and continuing along numerous intermediate locations 210B (with one such example intermediate location 210B shown) and ending at location 210C, and FIGS. 2A-2O illustrate additional details about using images from such a video to generate an associated floor map, as discussed further below. A VTFM (Visual data-To-Floor Map) system 140 is further executing on one or more server computing systems to generate and provide building floor maps 145 and/or other mapping-related information (not shown) based on use of the video/images 165 and optionally additional associated information (e.g., configuration and/or other supporting information supplied by VTFM system operator users via computing devices 105 and intervening computer network(s) 170)—additional details related to the automated operation of the VTFM system are included elsewhere herein, including with respect to FIGS. 2A-2O and 5. In some embodiments, the VCA system(s) and VTFM system 140 may execute on the same server computing system(s), such as if both systems are operated by a single entity or are otherwise executed in coordination with each other (e.g., with some or all functionality of both systems integrated together into a larger system), while in other embodiments the VTFM system may instead operate without a VCA system and instead obtain video (or other images) from one or more external sources and optionally store them locally (not shown) with the VTFM system for further analysis and use.

Various components of the mobile visual data acquisition device 185 are illustrated in FIG. 1A, including a browser 162 and/or a VCA system application 155 that are executed in memory 152 of the device 185 by one or more hardware processors 132, and including one or more imaging systems 135 (e.g., a 360° lens or one or more other fisheye lenses) to acquire visual data. The illustrated embodiment of mobile device 185 further includes one or more sensor modules 148 that include a gyroscope 148a, accelerometer 148b and compass 148c in this example (e.g., as part of one or more IMU units, not shown separately, on the mobile device), optionally a GPS (or Global Positioning System) sensor or other position determination sensor (not shown in this example), a display system 142, etc. Other computing devices/systems 105, 175 and 180 may include various hardware components and stored information in a manner analogous to mobile device 185, which are not shown in this example for the sake of brevity, and as discussed in greater detail below with respect to FIG. 3.

In the example of FIG. 1A, the VCA system may perform automated operations involved in generating 360° video along a path through a building interior (e.g., in multiple rooms or other locations within a building or other structure), and optionally around some or all of the exterior of the building or other structure, such as using visual data acquired via the mobile device(s) 185, and for use in generating and providing a representation of an interior of the building or other structure. For example, in at least some such embodiments, such techniques may include using one or more mobile devices (e.g., a camera having one or more fisheye lenses sufficient to capture 360 degrees horizontally simultaneously, such as held by or mounted on a user or the user's clothing, etc.) to capture data from a building interior, but without having measured depth information to objects in an environment around the mobile device(s) (e.g., without using any depth-sensing sensors). Additional details related to embodiments of a system providing at least some such functionality of a VCA system (including an ICA system that may produce sequences of images) are included in U.S. Non-Provisional patent application Ser. No. 16/236,187, filed Dec. 28, 2018 and entitled "Automated Control Of Image Acquisition Via Use Of Acquisition Device Sensors"; in U.S. Non-Provisional patent application Ser. No. 16/190, 162, filed Nov. 14, 2018 and entitled "Automated Mapping Information Generation From Inter-Connected Images"; in U.S. Non-Provisional patent application Ser. No. 17/013, 323, filed Sep. 4, 2020 and entitled "Automated Analysis Of Image Contents To Determine The Acquisition Location Of The Image"; and in U.S. Non-Provisional patent application Ser. No. 15/649,434, filed Jul. 13, 2017 and entitled "Connecting And Using Building Interior Data Acquired From Mobile Devices" (which includes disclosure of a BICA system that an example embodiment of a VCA system generally directed to obtaining and using panorama images from within one or more buildings or other structures); each of which is incorporated herein by reference in its entirety.

One or more end users (not shown) of one or more map viewer client computing devices 175 may further interact over computer networks 170 with the VTFM system 140 (and optionally the VCA system 160), such as to obtain, display and interact with a generated floor map. In addition, while not illustrated in FIG. 1A, a 2D floor map (or portion of it) may be linked to or otherwise associated with one or more additional types of information, such as one or more associated and linked images or other associated and linked information, a corresponding separate 3D floor map model rendering of the building and/or 2.5D model rendering of the building, etc., and including for a floor map of a multi-story or otherwise multi-level building to have multiple associated sub-floor maps for different stories or levels that are inter-linked (e.g., via connecting stairway passages). Accordingly, non-exclusive examples of an end user's interactions with a displayed or otherwise generated 2D floor map of a building may include one or more of the following: to change between a floor map view and a view of a particular image at a viewing location within or near the floor map; to change between a 2D floor map view and a 2.5D or 3D model view that optionally includes images texture-mapped to walls of the displayed model; to change the horizontal and/or vertical viewing direction from which a corresponding subset view of (or portal into) a panorama image is displayed, such as to determine a portion of a panorama image in a 3D spherical coordinate system to which a current user viewing direction is directed, and to render a corresponding planar image that illustrates that portion of the panorama image without the curvature or other distortions present in the original panorama image; etc. Additional details regarding example embodiments of a system to provide or otherwise support at least some functionality of a building map viewer system and routine as discussed herein, are included with respect to an example ILTM system in U.S. Non-Provisional patent application Ser. No. 15/950,881, filed Apr. 11, 2018 and entitled "Presenting Image Transition Sequences Between Viewing Locations"; with respect to an example BMLSM system in U.S. Provisional Patent Application No. 62/911, 959, filed Oct. 7, 2019 and entitled "Providing Simulated Lighting Information For Three-Dimensional Building Models"; with respect to an example BMLSM system in U.S. Non-Provisional patent application Ser. No. 16/841, 581, filed Apr. 6, 2020 and entitled "Providing Simulated Lighting Information For Three-Dimensional Building Models"; and with respect to an example FPSDM system in U.S. Provisional Patent Application No. 63/081,744, filed Sep. 22, 2020 and entitled "Automated Identification And Use Of Building Floor Plan Information"; each of which is incorporated herein by reference in its entirety. In addition, while not illustrated in FIG. 1A, in some embodiments the client computing devices 175 (or other devices, not shown) may receive and use generated floor maps and/or other generated mapping-related information in additional manners, such as to control or assist automated navigation activities by those devices (e.g., by autonomous vehicles or other devices), whether instead of or in addition to display of the generated information. In at least some embodiments and situations, the presentation or other display of a 3D floor map model and/or of a 2D floor map of a building may occur on a screen of a client device with which one or more end users are interacting via keyboard, touch or other input devices, while in other embodiments and situations, such presentation or other display of a 3D floor map model and/or of a 2D floor map may be performed on a head-mounted display device worn by an end user, such as to provide a virtual reality and/or augmented reality display of the building with which the end user can interact and move about (e.g., as part of entertainment activities being provided to the end user).

In the depicted computing environment of FIG. 1A, the network 170 may be one or more publicly accessible linked networks, possibly operated by various distinct parties, such as the Internet. In other implementations, the network 170 may have other forms, such as to instead be a private network (such as a corporate or university network) that is wholly or partially inaccessible to non-privileged users. In still other implementations, the network 170 may include both private and public networks, with one or more of the private networks having access to and/or from one or more of the public networks. Furthermore, the network 170 may include various types of wired and/or wireless networks and connections in various situations.

FIG. 1B depicts a block diagram of an exemplary building interior environment in which 360° video is generated, for use by the VTFM system to generate and provide a corresponding building floor map, as discussed in greater detail with respect to FIGS. 2A-2O. In particular, FIG. 1B illustrates one story of a multi-story building 198 with an interior that was captured at least in part via a 360° video by a mobile visual data acquisition device 185 with video acquisition capabilities as it is moved through the building interior along travel path 115. An embodiment of the VCA system (e.g., VCA system 160 on server computing system(s) 180, a copy 155 of some or all of the VCA system executing on the mobile visual data acquisition device 185, etc.) may automatically perform or assist in the capturing of the video data representing the building interior, as well as to further analyze the captured video data to generate a floor map or other visual representation of the building interior. While such a mobile visual data acquisition device may include various hardware components, such as one or more camera lenses and corresponding image sensors, one or more other hardware sensors (e.g., a gyroscope, an accelerometer, a compass, etc., such as part of one or more IMUs, or inertial measurement units, of the mobile device; an altimeter; light detector; etc.), a GPS receiver, one or more hardware processors, memory, a display, a microphone, etc., the mobile device may not in at least some embodiments have access to or use equipment to measure the depth of objects in the building relative to a location of the mobile device, such that relationships of video capture locations to the surrounding structure of the building may be determined in part or in whole based on features in different frames/images, but without using any data from any such depth sensors. In addition, while directional indicator 109 is provided in FIG. 1B for reference of the viewer, the mobile device and/or VCA system may not use such absolute directional information in at least some embodiments, such as to instead determine relative directions and distances without regard to actual geographical positions or directions in such embodiments.

In operation, the mobile visual data acquisition device 185 arrives at a first viewing location 210A within a first room of the building interior (in this example, in a living room accessible via an external door 190-1), and initiates a video capture that begins with a portion of the building interior that is visible from that viewing location 210A (e.g., some or all of the first room, and optionally small portions of one or more other adjacent or nearby rooms, such as through doors, halls, stairs or other connecting passages from the first room). The video capture may be performed in various manners as discussed herein, and may include a number of objects or other features (e.g., structural details) that may be visible in images captured from a particular capture location—in the example of FIG. 1B, such objects or other features along the path 115 may include the doorways 190 (including 190-1 and 190-3) and 197 (e.g., with swinging and/or sliding doors), windows 196 (including 196-1, 196-2, 196-3 and 196-4), corners or edges 195 (including corner 195-1 in the northwest corner of the building 198, corner 195-2 in the northeast corner of the first room, corner 195-3 in the southwest corner of the first room, corner 195-4 at the northern edge of the inter-room passage between the first room and a hallway, etc.), furniture 191-193 (e.g., a couch 191; chairs 192-1 to 192-3; tables 193-1 and 193-2; etc.), pictures or paintings or televisions or other hanging objects 194 (such as 194-1 and 194-2) hung on walls, light fixtures, various built-in appliances or fixtures (not shown), etc. The user may also optionally provide a textual or auditory identifier to be associated with one or more capture locations at which the mobile device is located, such as "living room" for the room including capture location 210A, while in other embodiments the VTFM system may automatically generate such identifiers (e.g., by automatically analyzing video and/or other recorded information for a building to perform a corresponding automated determination, such as by using machine learning) or the VCA system may instead determine such identifiers or the identifiers may not be used. After the video is captured at the beginning viewing location 210A, the mobile device 185 may move or be moved along the path 115 throughout the building interior, recording video and optionally other data from the hardware components (e.g., from one or more IMUs, a light detector, etc.). This process may optionally continue external to the building, as illustrated for ending capture location 210C in this example.

Various details are provided with respect to FIGS. 1A-1B, but it will be appreciated that the provided details are non-exclusive examples included for illustrative purposes, and other embodiments may be performed in other manners without some or all such details.

FIGS. 2A-2O illustrate examples of generating and presenting a floor map for a building using 360° video and/or other visual information of the building interior, such as for the building 198 and using video captured along the path 115 discussed in FIG. 1B.

In particular, FIG. 2A includes information 255a illustrating a portion of the house 198 of FIG. 1B, including the living room and portions of the further rooms to the east of the living room. In this example, information is illustrated for a portion of the path 115 illustrated in FIG. 1B, and in particular illustrates a sequence of locations 215 along the path at which one or more video frame images are captured of the surrounding interior of the house—examples of such locations include capture locations 240a-c, with further information related to video frame images captured from those locations shown in FIGS. 2B-2D. In this example, the locations 215 along the path are shown as being separated by short distances (e.g., a foot, an inch, a fraction of an inch, etc.), although it will be appreciated that video capture may be substantially continuous—thus, in at least some embodiments, the selection of video frame images for an image group to be analyzed may include selecting images that are separated by such distances and/or that are separated by a short period of time between their capture (e.g., a second, a fraction of a second, multiple seconds, etc.). In other embodiments, video frame images may be selected for use in the image group based on other criteria, whether in addition to or instead of separation by distance and/or time.

Figure 2B:
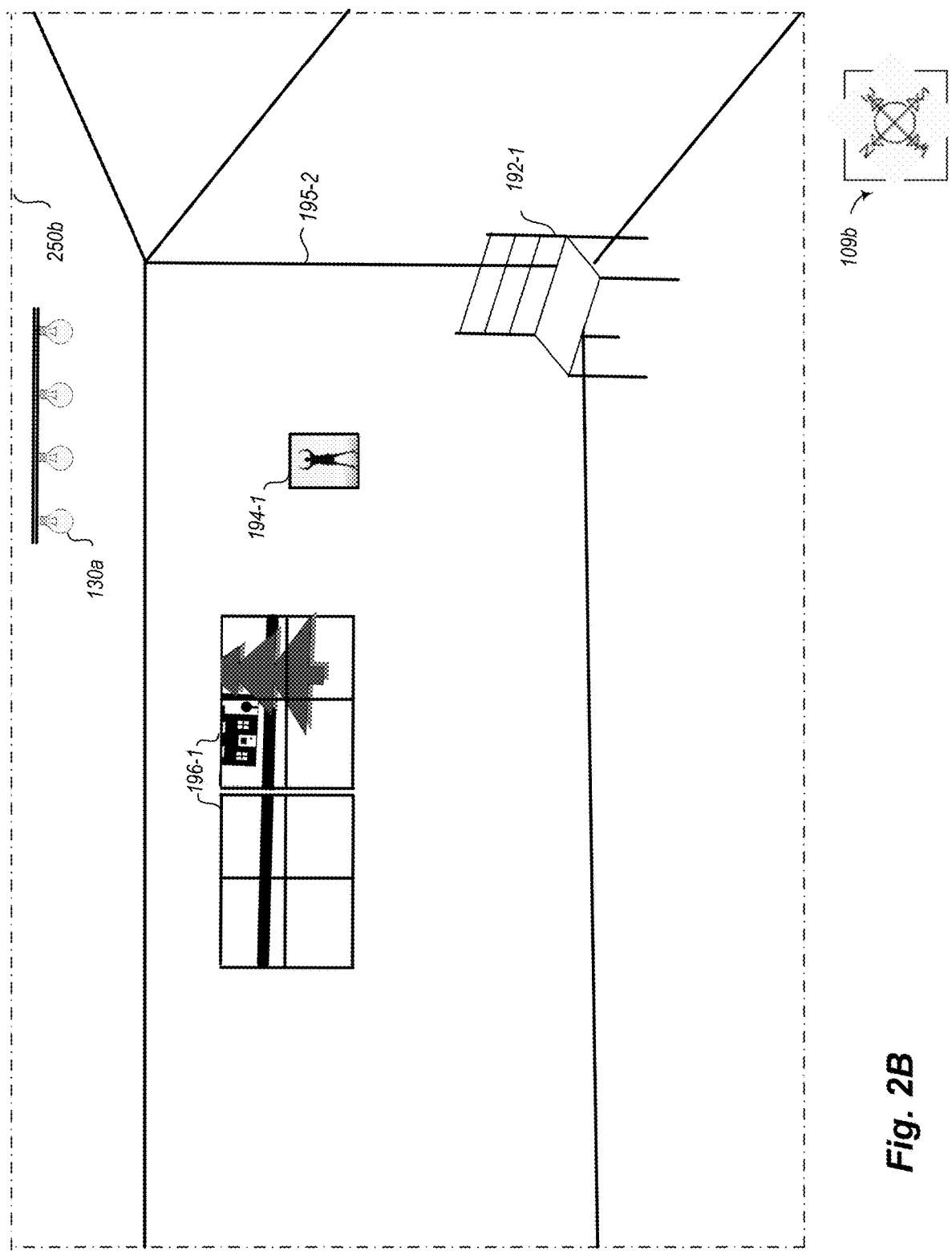

FIG. 2B continues the example of FIG. 2A, and illustrates an example image 250b captured from capture location 240b of FIG. 2A—the illustrated image is a perspective image taken in a northeasterly direction, such as a northeasterly facing subset view of a 360-degree frame taken from that viewing location during video capture along the path 115 (or may instead be captured directly as a perspective image)—the directional indicator 109b is further displayed in this example to illustrate the northeasterly direction in which the image is taken. In the illustrated example, the displayed image includes various features that may be detected during subsequent automated analysis of the image, including built-in elements (e.g., light fixture 130a), furniture (e.g., chair 192-1), two windows 196-1, a picture 194-1 hanging on the north wall of the living room, and multiple room borders (including horizontal borders between a visible portion of the north wall of the living room and the living room's ceiling and floor, horizontal borders between a visible portion of the east wall of the living room and the living room's ceiling and floor, and the vertical border 195-2 between the north and east walls. No inter-room passages into or out of the living room (e.g., doors or other wall openings) are visible in this image.

FIGS. 2C and 2D further continue the examples of FIGS. 2A-2B, and illustrate additional example perspective images 250c and 250d, respectively, that are captured at locations 240a and 240c of FIG. 2A, respectively. In the examples of FIGS. 2C and 2D, the images are taken in a northwesterly direction, including to capture the northwest corner 195-1 of the living room—in a manner similar to that of image 250b of FIG. 2B, images 250c and 250d may each be subsets of larger 360° panorama image frames (e.g., consecutive frames, or frames separated by at most a specified amount of time) from captured video along the path 115 (or may instead be captured directly as perspective images). As with image 250b, images 250c and 250d include various features that may be detected during subsequent automated analysis of the images, including light fixture 130b, window 196-2, multiple room borders (including horizontal borders between a visible portion of the north wall of the living room and the living room's ceiling and floor, horizontal borders between a visible portion of the west wall of the living room and the living room's ceiling and floor, and the vertical border 195-1 between the north and west walls, although no inter-room passages into or out of the living room (e.g., doors or other wall openings) are visible in these images.

Images 250c and 250d illustrate that, since their capture locations 240a and 240c are close to each other, the contents of their images differ only in relatively small amounts, and thus images 250c and 250d share many features that may be identified in an automated analysis of the images but provide only limited information about differences in locations of those features between the images. To illustrate some such differences, image 250d is modified in this example to illustrate visual indications 285g of differences from corner 195-1 in image 250d to the corner's location in image 250c (as shown in dotted lines 262 in FIG. 2D for the purpose of comparison, but which would not otherwise be visible in image 250d). Since these differences are small, they provide only limited information from which the automated analysis may determine the size and shapes of the features and their distance from the capture locations of the respective images. Conversely, the capture location of 240b for image 250b differs significantly from capture locations 240a and 240c, but there may be little overlap in features between images captured from such capture locations if the images are perspective images in particular directions/orientations. However, by using 360° image frames at locations 215 that each capture substantially all of the interior of the living room, various matching features may be detected and used in each sub-group of two or more such images, as illustrated further with respect to FIGS. 2E-2J.

FIGS. 2E-2J continue the examples of FIGS. 2A-2D, and illustrate additional information about the living room and about analyzing 360° image frames from the video captured along the path 155 in order to determine the likely shape of the room. In particular, FIG. 2E includes information 255e illustrating that a 360° image frame taken from location 240b will share information about a variety of features with that of a 360° image frame taken from location 240a, although such features are only illustrated in FIG. 2E for a portion of the living room for the sake of simplicity. In FIG. 2E, example lines of sight 228 from location 240b to various example features in the room are shown, and similar example lines of sight 227 from location 240a to corresponding features are shown, which illustrate degrees of difference between the views at significantly spaced capture locations. Accordingly, analysis of the sequence of images in the image group corresponding to locations 215 of FIG. 2A using SLAM and/or MVS and/or SfM techniques may provide a variety of information about the features of the living room, including information about associated planes of the features and normal orthogonal directions from the planes, as illustrated further with respect to FIGS. 2F-2I.

In particular, FIG. 2F illustrates information 255f about the northeast portion of the living room that is visible in subsets of 360° image frames taken from locations 240a and 240b, and FIG. 2G illustrates information 255g about the northwest portion of the living room that is visible in other subsets of 360° image frames taken from locations 240a and 240b, with various features in those portions of the living room being visible in both 360° image frames (e.g., corners 195-1 and 195-2, windows 196-1 and 1962, etc. As part of the automated analysis of the 360° image frames using the SLAM and/or MVS and/or SfM techniques, information about planes 286e and 286f corresponding to portions of the northern wall of the living room may be determined from the features that are detected, and information 287e and 285f about portions of the east and west walls of the living room may be similarly determined from corresponding features identified in the images. In addition to identifying such plane information for detected features (e.g., for each point in a determined sparse 3D point cloud from the image analysis), the SLAM and/or MVS and/or SfM techniques may further determine information about likely positions and orientations/directions 220 for the image(s) from capture location 240a, and likely positions and orientations/directions 222 for the image(s) from capture location 240b (e.g., positions 220g and 222g in FIG. 2F of the capture locations 240a and 240b, respectively, and optionally directions 220e and 222e for the image subsets shown in FIG. 2F; and corresponding positions 220g and 222g in FIG. 2G of the capture locations 240a and 240b, respectively, and optionally directions 220f and 222f for the image subsets shown in FIG. 2G). While only features for part of the living room are illustrated in FIGS. 2F and 2G, it will be appreciated that the other portions of the 360° image frames corresponding to other portions of the living room may be analyzed in a similar manner, in order to determine possible information about possible planes for the various walls of the room, as well as for other features (not shown) in the living room. In addition, similar analyses may be performed between some or all other images at locations 215 in the living room that are selected for use in the image group, resulting in a variety of determined feature planes from the various image analyses that may correspond to walls of the room.

FIG. 2H continues the examples of FIGS. 2A-2G, and illustrates information 255h about a variety of determined feature planes that may correspond to the west and north walls of the living room, from analyses of the 360° image frames captured at locations 240a and 240b. The illustrated plane information includes determined planes 286G near or at the northern wall (and thus corresponding possible locations of the northern wall), and determined planes 285G near or at the western wall (and thus corresponding possible locations of the western wall). As would be expected, there are a number of variations in different determined planes for the northern and western walls from different features detected in the analysis of the two 360° image frames, such as differences in position, angle and/or length, causing uncertainty as to the actual exact position and angle of each of the walls. While not illustrated in FIG. 2H, it will be appreciated that similar determined feature planes for the other walls of the living room would similarly be detected, along with determined feature planes corresponding to features that are not along the walls (e.g., furniture).

FIG. 2I continues the examples of FIGS. 2A-2H, and illustrates information 255i about additional determined feature planes that may correspond to the west and north walls of the living room, from analyses of various additional 360° image frames selected for the image group corresponding to example locations 240 along the path 115 in the living room—as would be expected, the analyses of the further images provides even greater variations in different determined planes for the northern and western walls. FIG. 2I further illustrates additional determined information that is used to aggregate information about the various determined feature planes in order to identify likely locations 295a and 295b of the west and north walls, as illustrated in information 255j of FIG. 2J. In particular, FIG. 2I illustrates information 291a about normal orthogonal directions for some of the determined feature planes corresponding to the west wall, along with additional information 290a about those determined feature planes. In the example embodiment, the determined feature planes are clustered to represent hypothesized wall locations of the west wall, and the information about the hypothesized wall locations is combined to determine the likely wall location 295a, such as by weighting information from the various clusters and/or the underlying determined feature planes. In at least some embodiments, the hypothesized wall locations and/or normal information is analyzed via use of machine learning techniques to determine the resulting likely wall location, optionally by further applying assumptions or other constraints (such as a 90° corner, as illustrated in information 282 of FIG. 2H, and/or having flat walls) as part of the machine learning analysis or to results of the analysis. Similar analysis may be performed for the north wall using information 290b about corresponding determined feature planes and additional information 291b about resulting normal orthogonal directions for at least some of those determined feature planes. FIG. 2J illustrates the resulting likely wall locations 295a and 295b for the west and north walls of the living room, respectively.

While not illustrated in FIG. 2I, it will be appreciated that similar determined feature planes and corresponding normal directions for the other walls of the living room will similarly be detected and analyzed to determine their likely locations, resulting in an estimated overall room shape for the living room. In addition, similar analyses are performed for each of the rooms of the building, providing estimated room shapes of each of the rooms.

Figure 2K:
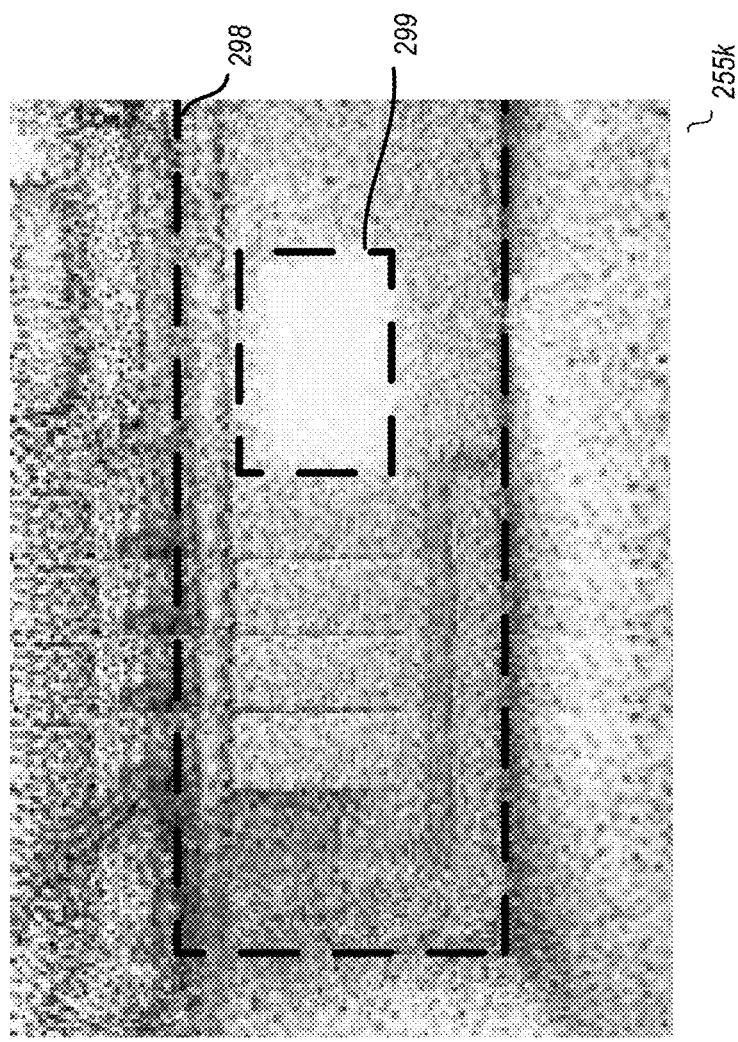

FIG. 2K continues the examples of FIGS. 2A-2J, and illustrates information 255k about additional information that may be generated from images in an image group and used in one or more manners in at least some embodiments. In particular, video frames captured in the living room of the house 198 may be analyzed in order to determine a 3D shape of the living room, such as from a 3D point cloud of features detected in the video frames (e.g., using SLAM and/or SfM and/or MVS techniques). In this example, information 255k reflects an example portion of such a point cloud for the living room, such as in this example to correspond to a northwesterly portion of the living room (e.g., to include northwest corner 195-1 of the living room, as well as windows 196-1) in a manner similar to image 250c of FIG. 2C. Such a point cloud may be further analyzed to determine planar areas, such as to correspond to walls, the ceiling, floor, etc., as well as in some cases to detect features such as windows, doorways and other inter-room openings, etc.—in this example, a first planar area 298 corresponding to the north wall of the living room is identified, with a second planar area 299 corresponding to windows 196-1 being further identified. It will be appreciated that various other walls and other features may be similarity identified in the living room and in the other rooms of the house 198.

Figure 2L:
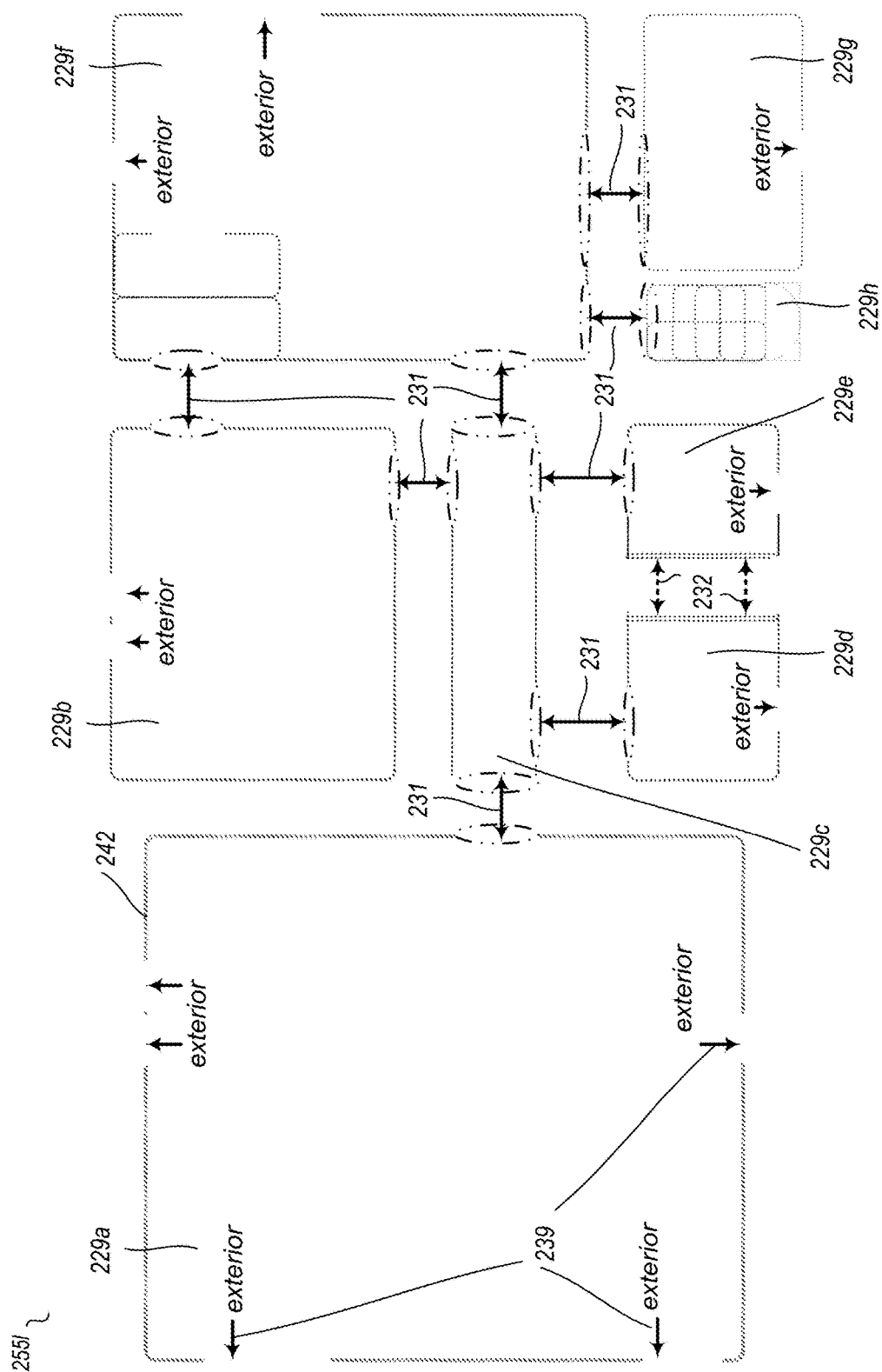

FIG. 2L illustrates additional information 255l corresponding to, after estimated room shapes are determined for the rooms of the illustrated floor of the house 198, positioning the rooms' estimated room shapes relative to each other, based at least in part on connecting inter-room passages between rooms and matching room shape information between adjoining rooms—in at least some embodiments, such information may be treated as constraints on the positioning of the rooms, and an optimal or otherwise preferred solution is determined for those constraints. Examples of such constraints in FIG. 2L include matching 231 connecting passage information (e.g., passages detected in the automated image analyses discussed with respect to FIGS. 2E-2J) for adjacent rooms so that the locations of those passages are co-located, and matching 232 shapes of adjacent rooms in order to connect those shapes (e.g., as shown for rooms 229d and 229e). Various other types of information may be used in other embodiments for room shape positions, whether in addition to or instead of pass-based constraints and/or room shape-based constraints, such as exact or approximate dimensions for overall size of the house (e.g., based on additional metadata available regarding the building, analysis of images from one or more capture locations external to the building, etc.). House exterior information 239 may further be identified and used as constraints (e.g., based at least in part of automated identification of passages and other features corresponding to the building exterior, such as windows), such as to prevent another room from being placed at a location that has been identified as the building's exterior.

Figure 2M:
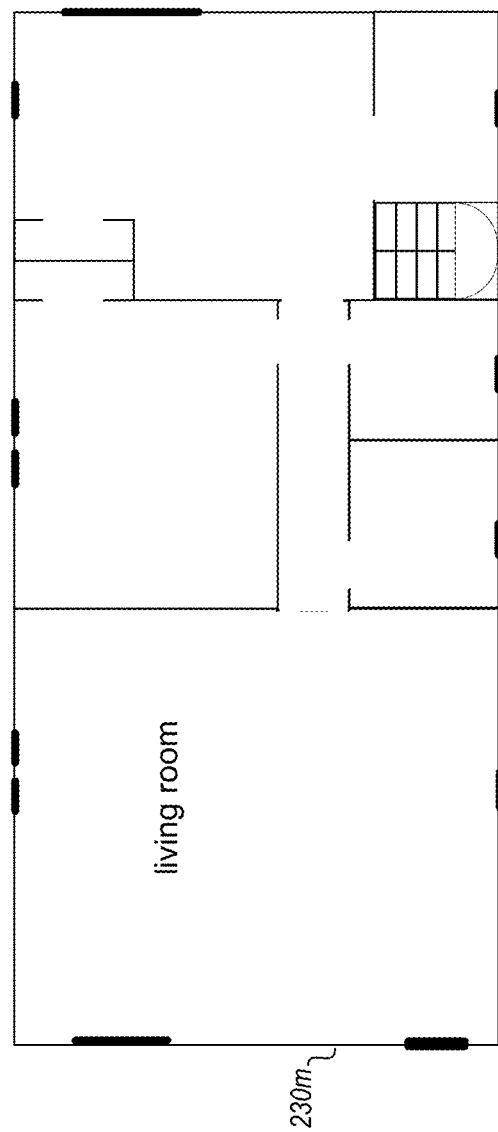
Figure 2N:
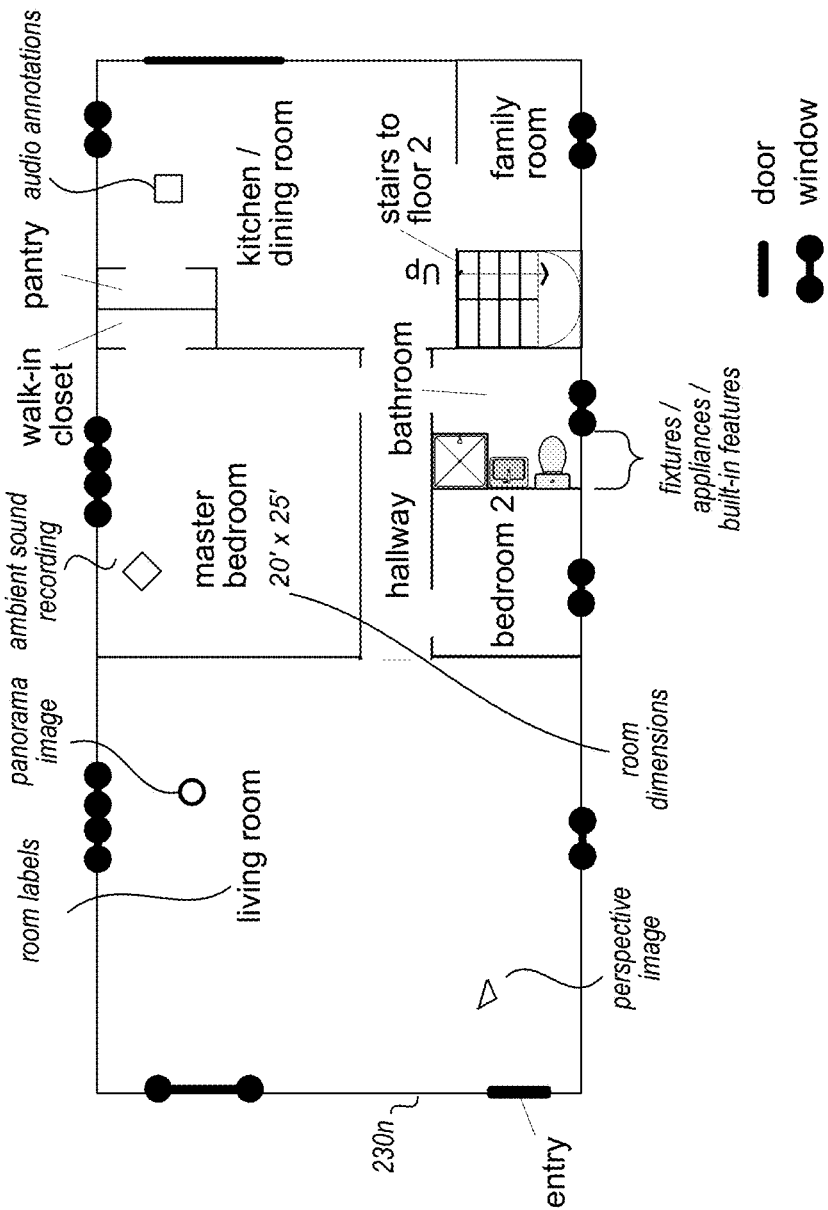
Figure 20:
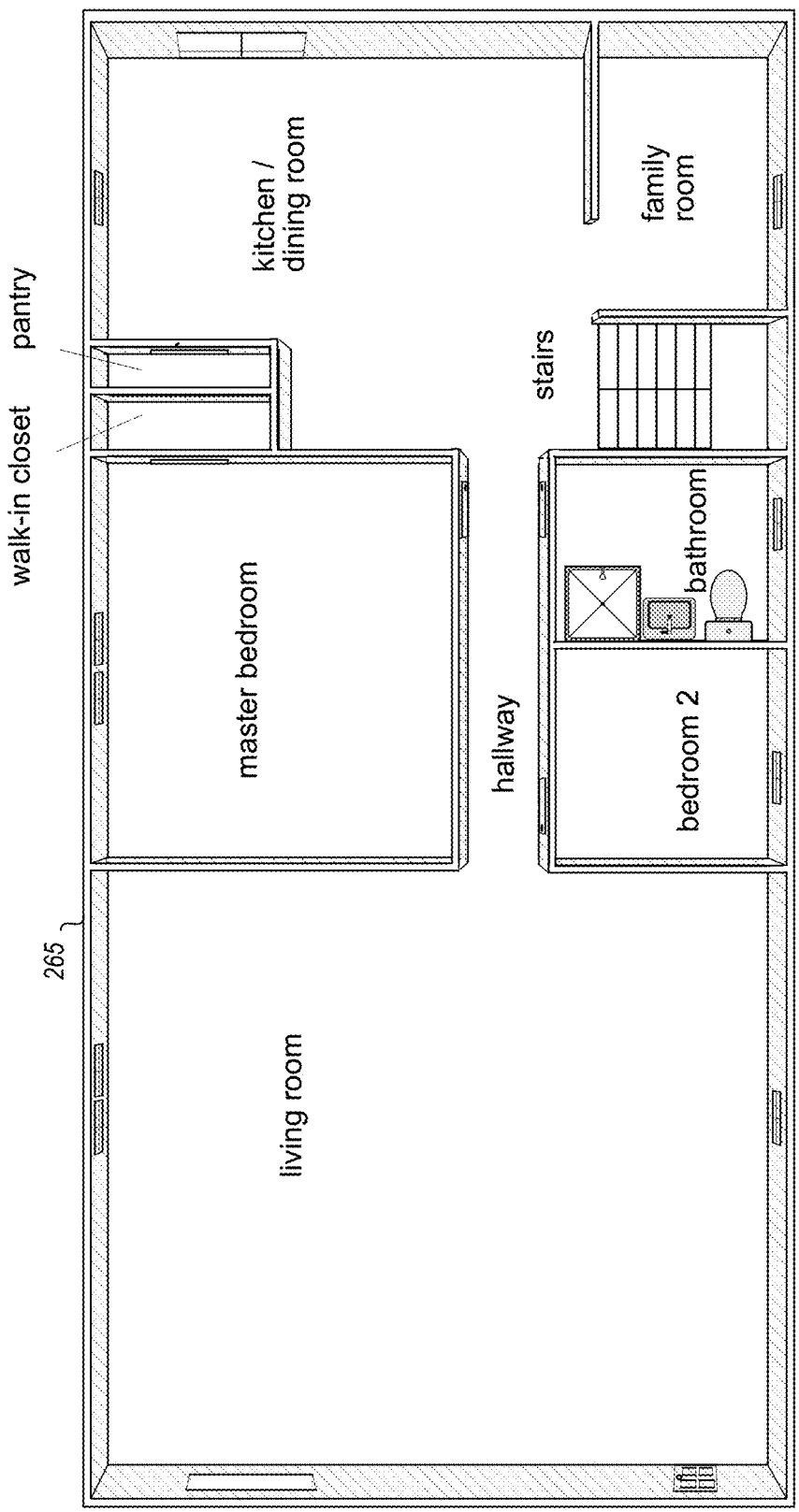

FIGS. 2M-2O continue the examples of FIGS. 2A-2L, and illustrate mapping information that may be generated from the types of analyses discussed in FIGS. 2A-2L. In particular, FIG. 2M illustrates an example floor map 230m that may be constructed based on the positioning of the estimated room shapes, which in this example includes walls and indications of doors and windows. In some embodiments, such a floor map may have further information shown, such as about other features that are automatically detected by the image analysis and/or that are subsequently added by one or more users. For example, FIG. 2N illustrates a modified floor map 230n that includes additional information of various types, such as may be automatically identified from image analysis and added to the floor map 230m, including one or more of the following types of information: room labels (e.g., "living room" for the living room), room dimensions, visual indications of fixtures or appliances or other built-in features, visual indications of positions of additional types of associated and linked information (e.g., of panorama images and/or perspective images that an end user may select for further display, of audio annotations and/or sound recordings that an end user may select for further presentation, etc.), visual indications of doors and windows, etc.—in other embodiments and situations, some or all such types of information may instead be provided by one or more VTFM system operator users and/or VCA system operator users. In addition, when the floor maps 230m and/or 230n are displayed to an end user, one or more user-selectable controls may be added to indicate a current floor that is displayed and/or to allow the end user to select a different floor to be displayed—in some embodiments, a change in floors or other levels may also be made directly from the displayed floor map, such as via selection of a corresponding connecting passage (e.g., stairs to a different floor). It will be appreciated that a variety of other types of information may be added in some embodiments, that some of the illustrated types of information may not be provided in some embodiments, and that visual indications of and user selections of linked and associated information may be displayed and selected in other manners in other embodiments.

FIG. 2O continues the examples of FIGS. 2A-2N, and Illustrates additional information 265 that may be generated from the automated analysis techniques disclosed herein, which in this example is a 2.5D or 3D model of the floor of the house. Such a model 265 may be additional mapping-related information that is generated based on the floor map 230m or 230n, but with additional information about height shown in order to illustrate visual locations in walls of features such as windows and doors. While not illustrated in FIG. 2O, additional information may be added to the displayed walls in some embodiments, such as from images taken during the video capture (e.g., to illustrate actual paint, wallpaper or other surfaces from the house on the rendered model 265).

Various details have been provided with respect to FIGS. 2A-2O, but it will be appreciated that the provided details are non-exclusive examples included for illustrative purposes, and other embodiments may be performed in other manners without some or all such details.

Figure 3:
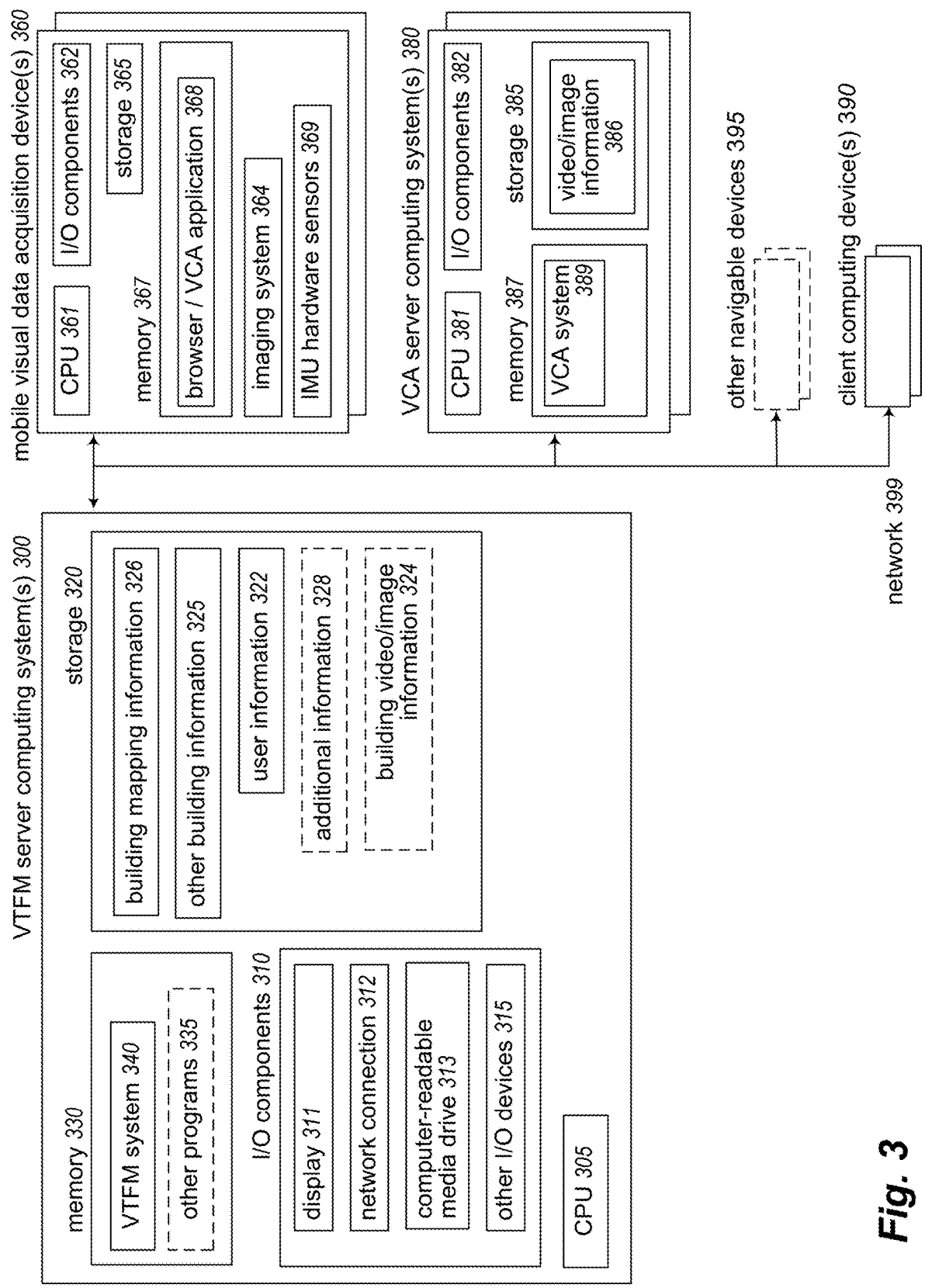
FIG. 3 is a block diagram illustrating computing systems suitable for executing embodiments of one or more systems that perform at least some of the techniques described in the present disclosure.

FIG. 3 is a block diagram illustrating an embodiment of one or more server computing systems 300 executing an implementation of a VTFM system 340, and one or more server computing systems 380 executing an implementation of a VCA system 389—the server computing system(s) and VTFM and/or VCA systems may be implemented using a plurality of hardware components that form electronic circuits suitable for and configured to, when in combined operation, perform at least some of the techniques described herein. In the illustrated embodiment, each server computing system 300 includes one or more hardware central processing units ("CPUs") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.). Each server computing system 380 may have similar components, although only one or more hardware processors 381, memory 387, storage 385 and I/O components 382 are illustrated in this example for the sake of brevity.

The server computing system(s) 300 and executing VTFM system 340, and server computing system(s) 380 and executing VCA system 389, may communicate with each other and with other computing systems and devices in this illustrated embodiment via one or more networks 399 (e.g., the Internet, one or more cellular telephone networks, etc.), such as to interact with user client computing devices 390 (e.g., used to view floor maps, and optionally associated images and/or other related information), and/or mobile visual data acquisition devices 360 (e.g., used to acquire video and optionally additional images and/or other information for buildings or other environments to be modeled), and/or optionally other navigable devices 395 that receive and use floor maps and optionally other generated information for navigation purposes (e.g., for use by semi-autonomous or fully autonomous vehicles or other devices). In other embodiments, some of the described functionality may be combined in less computing systems, such as to combine the VTFM system 340 and the visual data acquisition functionality of device(s) 360 in a single system or device, to combine the VCA system 389 and the visual data acquisition functionality of device(s) 360 in a single system or device, to combine the VTFM system 340 and the VCA system 389 in a single system or device, to combine the VTFM system 340 and the VCA system 389 and the visual data acquisition functionality of device(s) 360 in a single system or device, etc.

In the illustrated embodiment, an embodiment of the VTFM system 340 executes in memory 330 of the server computing system(s) 300 in order to perform at least some of the described techniques, such as by using the processor(s) 305 to execute software instructions of the system 340 in a manner that configures the processor(s) 305 and computing system 300 to perform automated operations that implement those described techniques. The illustrated embodiment of the VTFM system may include one or more components, not shown, to each perform portions of the functionality of the VTFM system, and the memory may further optionally execute one or more other programs 335—as one specific example, a copy of the VCA system may execute as one of the other programs 335 in at least some embodiments, such as instead of or in addition to the VCA system 389 on the server computing system(s) 380. The VTFM system 340 may further, during its operation, store and/or retrieve various types of data on storage 320 (e.g., in one or more databases or other data structures), such as various types of user information 322, acquired video and/or image information 324 (e.g., 360° video or images received from VCA system 389, such as for analysis to generate floor maps, to provide to users of client computing devices 390 for display, etc.), optionally generated floor maps and other associated information 326 (e.g., generated and saved 2.5D and/or 3D models, building and room dimensions for use with associated floor maps, additional images and/or annotation information, etc.) and/or various types of optional additional information 328 (e.g., various analytical information related to presentation or other use of one or more building interiors or other environments).

In addition, an embodiment of the VCA system 389 executes in memory 387 of the server computing system(s) 380 in the illustrated embodiment in order to perform at least some of the described techniques, such as by using the processor(s) 381 to execute software instructions of the system 389 in a manner that configures the processor(s) 381 and computing system 380 to perform automated operations that implement those described techniques. The illustrated embodiment of the VCA system may include one or more components, not shown, to each perform portions of the functionality of the VCA system, and the memory may further optionally execute one or more other programs (not shown). The VCA system 389 may further, during its operation, store and/or retrieve various types of data on storage 385 (e.g., in one or more databases or other data structures), such as video and/or image information 386 acquired for one or more buildings, building and room dimensions for use with associated floor maps, additional images and/or annotation information, various analytical information related to presentation or other use of one or more building interiors or other environments, etc.—while not illustrated in FIG. 3, the VCA system may further store and use additional types of information, such as about other types of building information to be analyzed and/or provided to the VTFM system (e.g., building and room dimensions for use with associated floor maps, additional images and/or annotation information, various analytical information related to presentation or other use of one or more building interiors or other environments, etc.), about VCA system operator users, etc.

Some or all of the user client computing devices 390 (e.g., mobile devices), mobile visual data acquisition devices 360, optional other navigable devices 395 and other computing systems (not shown) may similarly include some or all of the same types of components illustrated for server computing system 300. As one non-limiting example, the mobile visual data acquisition devices 360 are each shown to include one or more hardware CPU(s) 361, I/O components 362, storage 365, and memory 367, with one or both of a browser and one or more client applications 368 (e.g., an application specific to the VTFM system and/or VCA system) executing within memory 367, such as to participate in communication with the VTFM system 340, VCA system 389 and/or other computing systems—the devices 360 each further include one or more imaging systems 364 and IMU hardware sensors 369, such as for use in acquisition of video and/or images, associated device movement data, etc. While particular components are not illustrated for the other navigable devices 395 or other computing systems 390, it will be appreciated that they may include similar and/or additional components.

It will also be appreciated that computing systems 300 and 380 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated VTFM system 340 and/or VCA system 389 may in some embodiments be distributed in various components, some of the described functionality of the VTFM system 340 and/or VCA system 389 may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the VTFM system 340 executing on server computing systems 300 and/or on devices 360, by the VCA software 389 executing on server computing systems 380, etc.) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4:
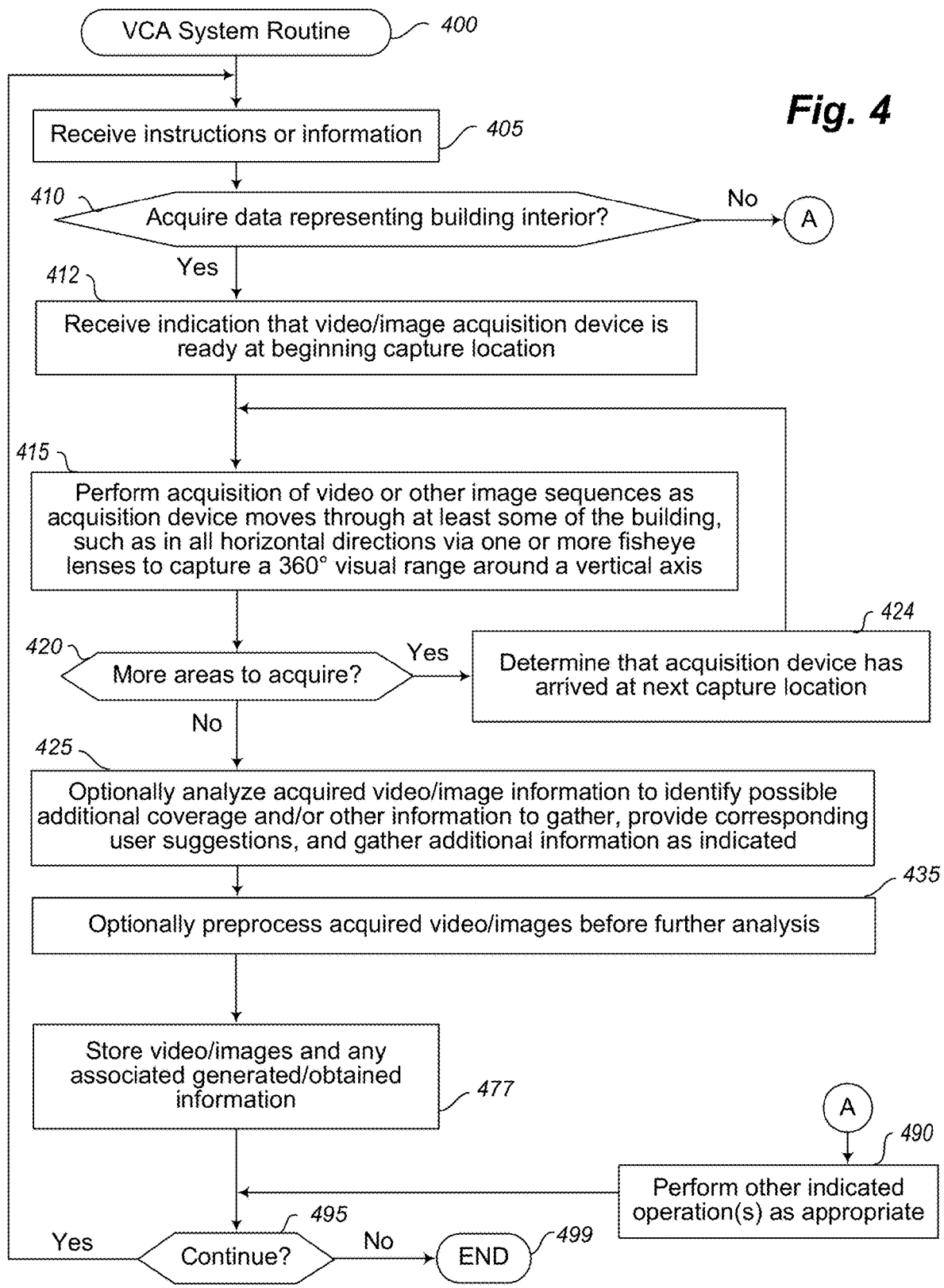
FIG. 4 illustrates an example embodiment of a flow diagram for a Visual data Capture and Analysis (VCA) system routine in accordance with an embodiment of the present disclosure.

FIG. 4 illustrates an example flow diagram of an embodiment of a VCA System routine 400. The routine may be performed by, for example, the VCA system 160 of FIG. 1A, the VCA system 389 of FIG. 3, and/or the VCA system described with respect to FIGS. 1A-2O and as otherwise described herein, such as to acquire video (e.g., continuous 360° video) and optionally other images at locations within buildings or other structures, such as for use in subsequent generation of related floor maps and/or other mapping information. While portions of the example routine 400 are discussed with respect to acquiring particular types of video at particular locations, it will be appreciated that this or a similar routine may be used to acquire images and/or other data (e.g., audio), whether instead of or in addition to such video. In addition, while the illustrated embodiment acquires and uses information from the interior of a target building, it will be appreciated that other embodiments may perform similar techniques for other types of data, including for non-building structures and/or for information external to one or more target buildings of interest. Furthermore, some or all of the routine may be executed on a mobile device used by a user to acquire video and/or image information, and/or by a system remote from such a mobile device.

The illustrated embodiment of the routine begins at block 405, where instructions or information are received. At block 410, the routine determines whether the received instructions or information indicate to acquire data representing a building interior, and if not continues to block 490. Otherwise, the routine proceeds to block 412 to receive an indication from a user of a mobile visual data acquisition device to begin the visual data acquisition process at a beginning capture location. After block 412, the routine proceeds to block 415 in order to perform visual data acquisition activities starting at the beginning capture location and continuing along a path through at least some of the building, in order to acquire video (e.g., continuous 360° video, with horizontal coverage of at least 360° around a vertical axis for each video frame/image) of the interior of the target building of interest, such as via one or more fisheye lenses on the mobile device. As one non-exclusive example, the mobile visual data acquisition device may include one or more lens that together provide simultaneous 360° horizontal coverage, while as another non-exclusive example, the mobile visual data acquisition device may be a rotating (scanning) panorama camera equipped with a fisheye lens, such as a 180° fisheye giving a full sphere at 360° rotation. The routine may also optionally obtain annotation and/or other information from the user regarding particular locations and/or the surrounding environment more generally (e.g., a current room), such as for later use in presentation of information regarding that location and/or surrounding environment.

After block 415 is completed, the routine continues to block 420 to determine if there are more area at which to acquire images, such as based on corresponding information provided by the user of the mobile device. If so, and when the user is ready to continue the process, the routine continues to block 422 to determine that the acquisition device is ready at the next beginning capture location for further visual data acquisition (e.g., based on an indication from the user), and then continues to block 415 to perform a corresponding acquisition of further video (or of other image sequences). In addition to capturing video, the mobile device may further capture additional information during some or all of the travel along the path through the building, such as additional sensor data (e.g., from one or more IMU, or inertial measurement units, on the mobile device or otherwise carried by the user), additional image information, recorded ambient sounds, recorded user verbal and/or textual annotations or other descriptions, ambient light levels, etc. for later use in presentation of information regarding that travel path or a resulting generated floor map and/or other mapping related information. In addition, the routine may further optionally provide one or more guidance cues to the user regarding the motion of the mobile device, quality of the sensor data and/or video information being captured, associated lighting/environmental conditions, and any other suitable aspects of capturing the building interior information.

Figure 5A:
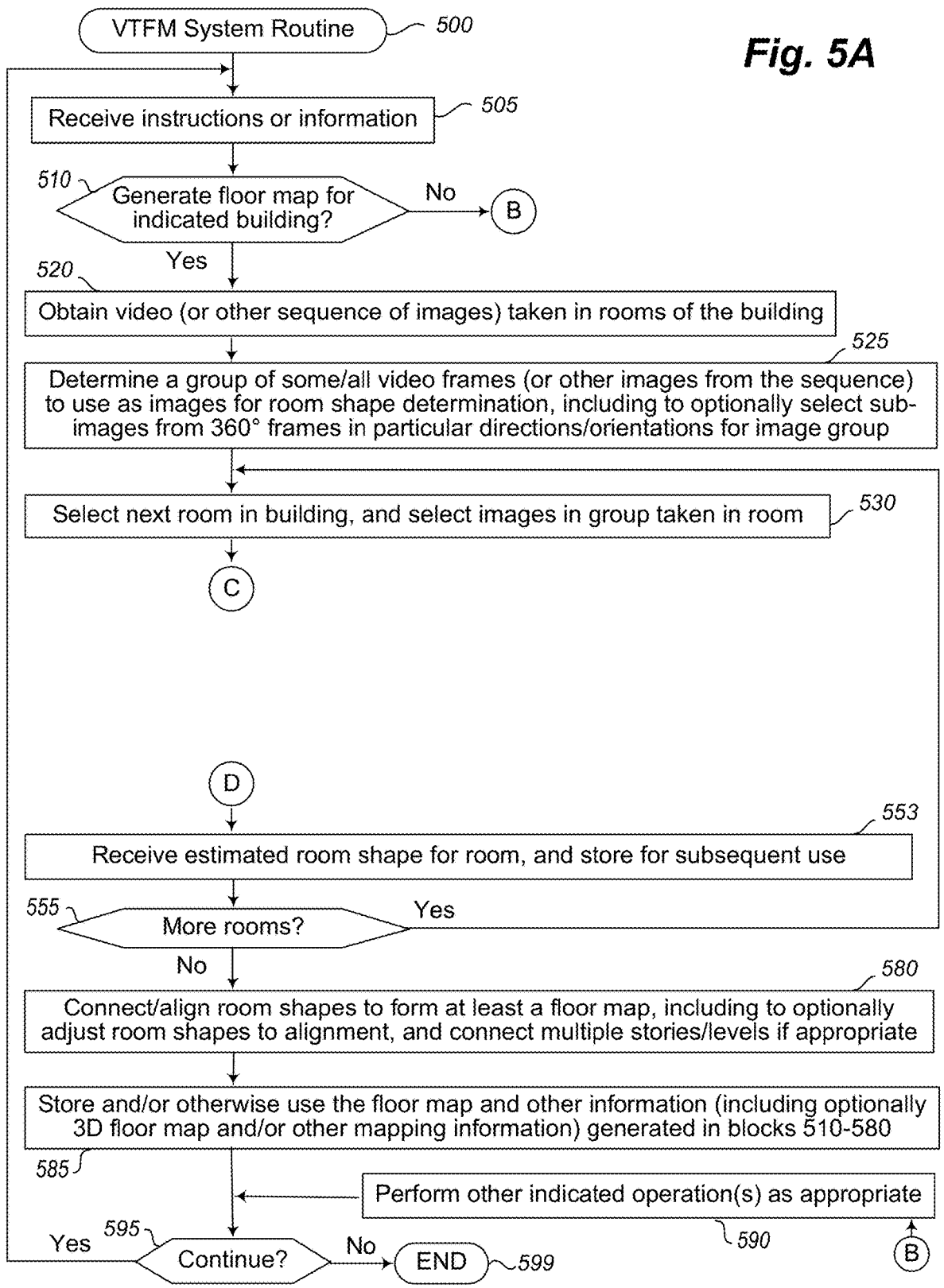

If it is instead determined in block 420 that there are not any more locations at which to acquire video information for the current building or other structure, the routine proceeds to block 425 to optionally analyze the acquired information for the building or other structure, such as to identify possible additional coverage (and/or other information) to acquire within the building interior. For example, the VCA system may provide one or more notifications to the user regarding the information acquired during capture, such as if it determines that one or more segments of the recorded information are of insufficient or undesirable quality, or do not appear to provide complete coverage of the building. After block 425, the routine continues to block 435 to optionally preprocess the acquired video information (and optionally other associated information) before its subsequent use for generating related mapping information. In block 477, the video and any associated generated or obtained information is stored for later use. FIGS. 5A-5B illustrate one example of a routine for generating a floor map representation of a building interior from the acquired video information.

If it is instead determined in block 410 that the instructions or other information recited in block 405 are not to acquire video and other data representing a building interior, the routine continues instead to block 490 to perform any other indicated operations as appropriate, such as any housekeeping tasks, to configure parameters to be used in various operations of the system (e.g., based at least in part on information specified by a user of the system, such as a user of a mobile device who captures one or more building interiors, an operator user of the VCA system, etc.), to obtain and store other information about users of the system, to respond to requests for generated and stored information, etc.

Following blocks 477 or 490, the routine proceeds to block 495 to determine whether to continue, such as until an explicit indication to terminate is received, or instead only if an explicit indication to continue is received. If it is determined to continue, the routine returns to block 405 to await additional instructions or information, and if not proceeds to step 499 and ends.

FIGS. 5A-5B illustrate an example embodiment of a flow diagram for a Visual data-To-Floor Map (VTFM) System routine 500. The routine may be performed by, for example, execution of the VTFM system 140 of FIG. 1A, the VTFM system 340 of FIG. 3, and/or an VTFM system as described with respect to FIGS. 1A-2O and elsewhere herein, such as to generate mapping information for a defined area based at least in part on analysis of video (e.g., 360° video with frames that are each 360° spherical panorama images) of the area. In the example of FIGS. 5A-5B, the generated mapping information includes a floor map of a building (e.g., a house), but in other embodiments, other types of mapping information may be generated for other types of buildings and used in other manners, as discussed elsewhere herein. In addition, while the example of FIGS. 5A-5B analyzes frames from continuous video on a path through the building, other types of sequences of images may be used in other embodiments, as discussed elsewhere herein.

The routine 500 begins at step 505, where information or instructions are received, and continues to block 510 to determine whether the instructions received in block 505 are to generate a floor map for an indicated building. If not, the routine proceeds to block 590, and otherwise continues to perform blocks 520-585 as part of the floor map generation process. In particular, in block 520, the routine obtains one or more videos (or other sequences of images) taken in rooms of the building (e.g., along a path taken through the building), such as by receiving the video(s) in block 505 or retrieving previously stored videos for the indicated building. After block 520, the routine continues to block 525 to determine an image group that include some or all of the video frames (or other images from the sequence) to use as images for the subsequent room shape determination analysis, including in some cases to use portions of 360° image frames in particular directions/orientations (or other images that have less than 360° of horizontal coverage) as images in the image group, while in other cases entire 360° image frames are used as images in the image group.

After block 525, the routine performs a loop of blocks 530-553 for each room in the building to analyze the images in that room and to determine a corresponding estimated room shape for the room. In particular, the routine in block 530 selects a next room from the building, beginning with the first, and select images from the image group that were taken in the room. In block 535, the routine then performs an image analysis of the selected images to detect structural features in the room, and analyzes information about the detected features to determine normal (orthogonal) directions for the detected features and to identify corresponding planar surfaces on which the detected features are located. In block 534, the routine then, for each of the selected images, combines the determined normal direction information for that image to determine corresponding wall location hypotheses based on that image, such as by generating aggregate normal and planar surface information from the individual feature normal directions and planar surface information by using a weighted combination or in another manner, and optionally determines other structural features in the room that are visible from the image. In block 536, the routine then proceeds to cluster and optimize the wall location hypotheses from the multiple images that were analyzed in order to determine likely wall locations for the room, and then combines the determined estimated wall locations to generate an estimated room shape for the room. As discussed in greater detail elsewhere herein, the combining of estimated wall locations to generate a room shape may use various constraints (e.g., 90° corners, flat walls, etc.).

After block 536, the routine continues to block 538 to determine whether to perform a consistency analysis for the room shape information estimated from the clustered and aggregated normal direction information and planar surface information, such as by estimating room shape information in a different manner and comparing the information from the different techniques. If not, the routine continues to block 540 to select the estimated room shape from block 536 as the likely room shape for the room, and otherwise proceeds to perform blocks 542-552 as part of the multi-view consistency analysis. In particular, the routine in block 542 generates a 3D point cloud for the room from the various selected images for the room, such as by using one or more of a SLAM analysis, SfM analysis or MVS analysis, including to localize each selected image in space and to determine the orientation/direction of the image/camera if other than a 360° image. In block 544, the routine then analyzes the 3D point cloud information to determine a second set of likely wall locations in the 3D point cloud, such as by grouping points that have a similar distance from the camera location and/or are within a threshold amount of a common planar surface, and then uses the determined second set of likely wall locations to generate a second estimated room shape for the room. As discussed in greater detail elsewhere herein, the combining of estimated wall locations to generate a room shape may use various constraints (e.g., 90° corners, flat walls, etc.). In block 546, the routine then compares the information and about the two sets of likely wall locations for the room to determine differences, including in some embodiments to optionally perform a multi-view consistency analysis by projecting expected pixel locations for one or more first selected images from one of the sets of likely wall locations to the likely wall locations of the other set for one or more second selected images, and by measuring an amount of reprojection error. The routine then determines in block 548 if the differences exceed a defined threshold, and if so proceeds to block 550 to optionally reduce those differences via further automated analyses, although in other embodiments such further automated analyses may not be performed and the room may instead proceed directly to block 552 after block 546. In block 550, the routine may, for example, initiate further image capture and/or analysis (e.g., by selecting and analyzing further images that were previously or currently captured) to improve one or both types of estimated room shapes, and/or may provide a notification of the differences and optionally receive and use further information from one or more system operator users of the VTFM system. While not illustrated in this example embodiment, in other embodiments one or both sets of likely wall locations and/or one or both estimated room shapes may be excluded from further uses if the differences exceed the threshold and are not reduced within it.

After block 550, or if it is instead determined in block 548 that the differences do not exceed the threshold, the routine continues to block 552 to determine a likely room shape to use for the room from the two estimated room shapes, such as by combining the information for the two room shapes, or by selecting one of the two room shapes to use (e.g., dynamically based on error or uncertainty information for the two room shapes and/or two sets of likely wall locations, using a predetermined priority for one of the types of techniques for estimating room shape, etc.). After blocks 540 or 552, the routine continues to block 553 to receive and store the room's estimated room shape for subsequent use, and then to block 555 to determine whether there are more rooms in the building having images to analyze, in which case the routine returns to block 530 to analyze the images for the next room in the building.

If it is instead determined in block 555 that there are not more rooms whose images are to be analyzed, the routine continues instead to block 580 to connect and align the room shapes for the various rooms to form a floor map of the building, such as by connecting inter-room passages and applying other constraints regarding room shape placement. As part of the connecting, one or more of the estimated room shapes may be further adjusted, such as to reflect an overall fit between rooms and/or for the entire house, and additional processing to connect multiple floors of the building may be further performed if appropriate. While not illustrated in this example, other types of mapping-related information may be similarly generated, such as to add height location to the generated 2D floor map in order to generate a 3D or 2.5D floor map for the building. After block 580, the routine continues to block 585 to store and/or otherwise use the generated floor map and any other generated mapping-related information, including to optionally provide some or all of the generated mapping-related information to one or more recipients (e.g., in response to previous requests).

If it was instead determined in block 510 that the instructions or information received in block 505 are not to generate a floor map for an indicated building, the routine continues instead to block 590 to perform one or more other indicated operations as appropriate. Such other indicated operations may include, for example, receiving additional information about a building to use in a later generation of a floor map for it, to receive and store additional information to associate with an already generated floor map (e.g., additional pictures, dimensions information, etc.), to provide requested information that was previously generated, to obtain and store other information about users of the system, to obtain and store information about requests from potential recipients of generated mapping related information to provide that information when it becomes available, etc.

After blocks 585 or 590, the routine continues to block 595 to determine whether to continue, such as until an explicit indication to terminate is received. If it is determined to continue, the routine returns to block 505, and otherwise continues to block 599 and ends.

Figure 6:
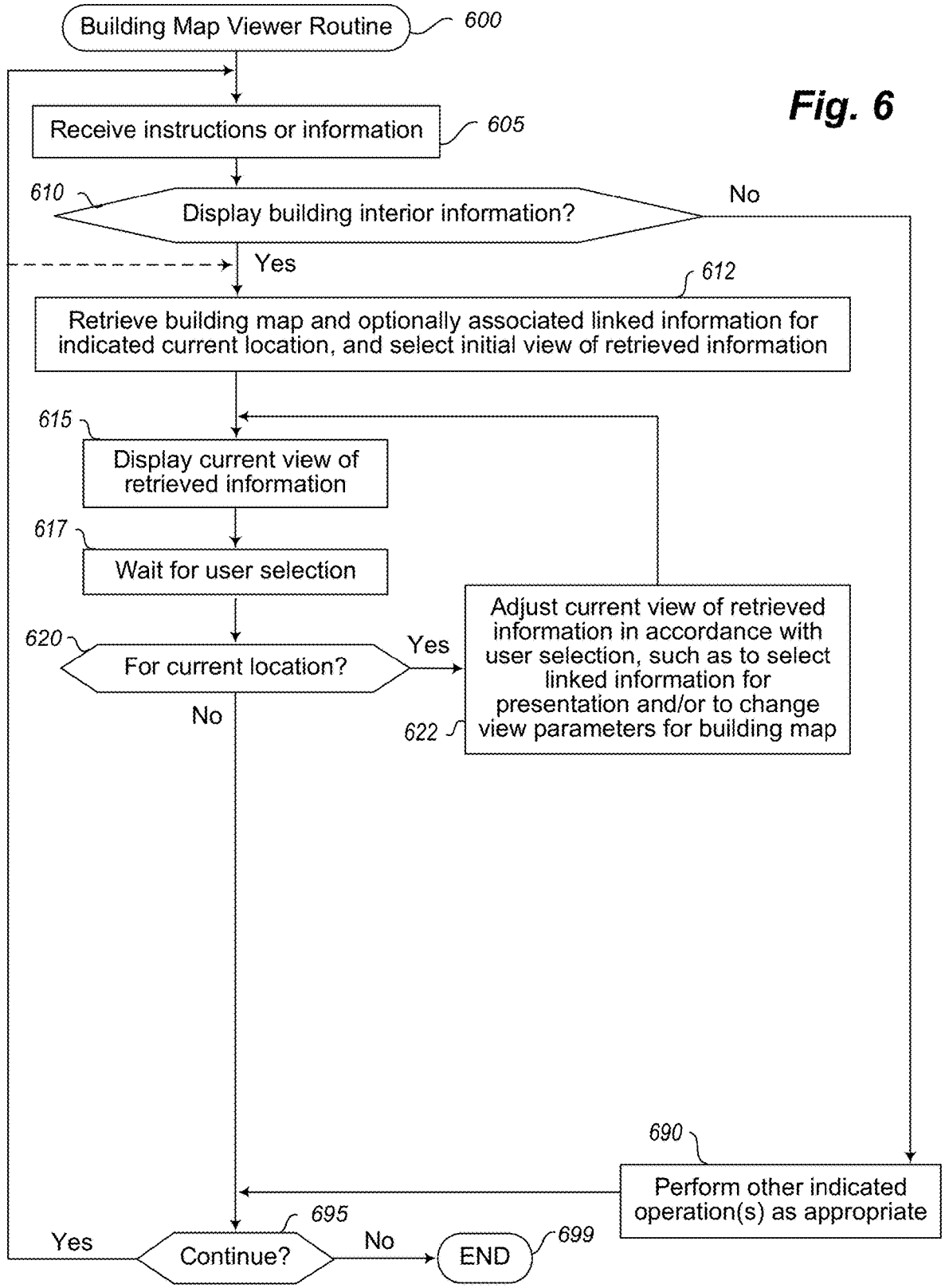
FIG. 6 illustrates an example embodiment of a flow diagram for a Building Map Viewer system routine in accordance with an embodiment of the present disclosure.

FIG. 6 illustrates an example embodiment of a flow diagram for a Building Map Viewer system routine 600. The routine may be performed by, for example, execution of a map viewer client computing device 175 and its software system(s) (not shown) of FIG. 1A, a client computing device 390 of FIG. 3, and/or a mapping information viewer or presentation system as described elsewhere herein, such as to receive and display mapping information (e.g., a floor map, whether 2D, 3D, 2.5D or other format) for a defined area, including in some situations to display additional information (e.g., images, such as 360° spherical panorama images) associated with particular locations in the mapping information. In the example of FIG. 6, the presented mapping information is based on a floor map of a building (such as a house) that may optionally have additional associated linked information (e.g., images taken within the building, sounds recorded within the building, annotations or other descriptive information associated with particular locations within the building, etc.), but in other embodiments, other types of mapping information may be presented for other types of buildings or environments and used in other manners, as discussed elsewhere herein.

The illustrated embodiment of the routine begins at block 605, where instructions or information are received. At block 610, the routine determines whether the received instructions or information indicate to display or otherwise present information representing a building interior, and if not continues to block 690. Otherwise, the routine proceeds to block 612 to retrieve a floor map for the building and optionally indications of associated linked information for the floor map and/or a surrounding location, and selects an initial view of the retrieved information (e.g., a view of the floor map). In block 615, the routine then displays or otherwise presents the current view of the retrieved information, and waits in block 617 for a user selection or other event (e.g., receiving updated information corresponding to the current view, an expiration of a timer, etc.). After a user selection or other event in block 617, if it is determined in block 620 that the user selection or other event corresponds to the current location (e.g., to change the current view), the routine continues to block 622 to update the current view in accordance with the user selection, and then returns to block 615 to update the displayed or otherwise presented information accordingly. The user selection and corresponding updating of the current view may include, for example, displaying or otherwise presenting a piece of associated linked information that the user selects (e.g., a particular image), changing how the current view is displayed (e.g., zooming in or out, rotating information if appropriate, selecting a new portion of the current view to be displayed or otherwise presented that was not previously visible, etc.).

If it is instead determined in block 610 that the instructions or other information recited in block 605 are not to present information representing a building interior, the routine continues instead to block 690 to perform any other indicated operations as appropriate, such as any housekeeping tasks, to configure parameters to be used in various operations of the system (e.g., based at least in part on information specified by a user of the system, such as a user of a mobile device who captures one or more building interiors, an operator user of the VTFM system, etc.), to obtain and store other information about users of the system, to respond to requests for generated and stored information, etc.

Following block 690, or if it is determined in block 620 that the user selection or other event does not correspond to the current location, the routine proceeds to block 695 to determine whether to continue, such as until an explicit indication to terminate is received, or instead only if an explicit indication to terminate is received. If it is determined to continue (e.g., if the user made a selection in block 617 related to a new location to present), the routine returns to block 605 to await additional instructions or information (or to continue on to block 612 if the user made a selection in block 617 related to a new location to present), and if not proceeds to step 699 and ends.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:
   obtaining, by one or more computing devices, and for a house with multiple rooms, a continuous 360° video that is taken by a capture device as it moves along a path through the multiple rooms and that is acquired without obtaining any other information about a depth from the path to any surfaces in the house, wherein the 360° video includes a plurality of frames that each has 360° of horizontal coverage around a vertical axis;
   determining, by the one or more computing devices, a sequence of images to represent an interior of the multiple rooms, including extracting the images from the frames, and wherein the sequence includes multiple images in each of the multiple rooms;
   using, by the one or more computing devices, the sequence of images to automatically generate a floor map of the house that has approximate room shapes of each of the multiple rooms positioned relative to approximate room shapes for other of the multiple rooms, including, for each of the multiple rooms:
   analyzing, by the one or more computing devices, and using at least one of Structure-from-Motion (SfM) analysis techniques or Simultaneous Localization And Mapping (SLAM) analysis techniques, the multiple images in the room from the sequence of images to detect features of the room that include one or more connecting passages to one or more other rooms of the multiple rooms, and to determine normal directions for the room that are orthogonal to planar surfaces associated with at least some of the detected features;
   combining, by the one or more computing devices, the determined normal directions for the room to identify estimated positions of the walls of the room, and connecting the estimated positions of the walls to generate the approximate room shape of the room; and
   arranging, by the one or more computing devices, and based at least in part on the one or more connecting passages to the one or more other rooms, the approximate room shape of the room relative to the approximate room shapes for the one or more other rooms;
   and further including using the arranged approximate room shapes of each of the multiple rooms to produce the floor map; and
   using, by the one or more computing devices, the floor map of the house for navigation of the house by one or more autonomous mobile devices.

2. The computer-implemented method of claim 1 wherein the capture device includes one or more lenses that simultaneously provide, in aggregate, the 360° of horizontal coverage around the vertical axis, wherein the obtaining of the continuous 360° video further includes acquiring, by the capture device and at each of a plurality of locations along the path, one or more video frames at the location, and wherein the determining of the sequence of images from includes selecting a subset of the frames of the continuous 360° video from which to perform the extracting of the images of the sequence.

3. The computer-implemented method of claim 1 wherein the analyzing and the combining for each of the multiple rooms includes, as part of the identifying of the estimated positions of the walls of the room, using constraints that include flat walls and 90° corners to determine the estimated positions from the determined normal directions for the room.

4. The computer-implemented method of claim 1 wherein the analyzing and the combining for each of the multiple rooms includes, as part of the identifying of the estimated positions of the walls of the room, using machine learning techniques to determine the estimated positions from the determined normal directions for the room.

5. A computer-implemented method comprising:
   determining, by one or more computing devices, and from a video taken along a path through multiple rooms of a building, a sequence of images to represent an interior of the multiple rooms, wherein the sequence includes multiple images in each of the multiple rooms;
   using, by the one or more computing devices, the sequence of images to automatically generate a floor map of the building based at least in part on positioning estimated room shapes relative to each other, including:
   determining, by the one or more computing devices, and for each of the multiple rooms without using any acquired depth information about a depth from the path to walls of the room, an estimated room shape of the room by:

analyzing, from the sequence of images, the multiple images in the room to detect features of the room that include at least one connecting passage to another room, and to determine normal directions that are orthogonal to planar surfaces associated with at least some of the detected features; and combining the determined normal directions to identify estimated positions of the walls of the room, and connecting the estimated positions of the walls to generate the estimated room shape of the room; and arranging, by the one or more computing devices, and to produce the floor map, the estimated room shapes for the multiple rooms relative to each other, including constraining locations of the estimated room shapes in the floor map based at least in part on connecting passages between rooms; and presenting, by the one or more computing devices, the floor map of the building on one or more client devices, to cause use of the displayed floor map of the building for navigating the building.

6. The computer-implemented method of claim 5 wherein the video is taken by a capture device that acquires the video while moving along the path through the multiple rooms of the building without obtaining any other information about a depth from the path to any surfaces in the building, wherein the video includes a plurality of frames, and wherein the determining of the sequence of images includes selecting at least some of the plurality of frames to use as images of the sequence.

7. The computer-implemented method of claim 6 wherein the capture device includes one or more lenses that aggregately provide 360° of simultaneous horizontal coverage around a vertical axis, and wherein each of the plurality of frames has 360° of horizontal coverage around the vertical axis.

8. The computer-implemented method of claim 6 wherein the selecting of the at least some frames includes, for one or more frames of the plurality of frames, extracting a subset of the frame to use as one of the images in the sequence.

9. The computer-implemented method of claim 5 wherein the one or more computing devices include the one or more client devices and/or include a capture device that is used to acquire the video while moving along the path through the multiple rooms of the building.

10. The computer-implemented method of claim 5 wherein the combining of the determined normal directions for each of the multiple rooms involves using constraints that include the walls of the room being flat and include corners of the room having right angles between two of the walls.

11. The computer-implemented method of claim 5 wherein the combining of the determined normal directions for each of the multiple rooms includes applying machine learning techniques to determine the identified estimated positions of the walls of the room from the determined normal directions for the room.

12. The computer-implemented method of claim 5 further comprising using, by the one or more computing devices, the floor map to further control navigation activities by an autonomous vehicle, including providing the floor map for use by the autonomous vehicle in moving between the multiple rooms of the building.

13. The computer-implemented method of claim 5 wherein the presenting of the floor map further includes:

transmitting, by the one or more computing devices, the floor map to one of the client devices for display to a user in a graphical user interface on the one client device along with user-selectable controls;

receiving information about a selection by the user of one of the user-selectable controls corresponding to a location along the path; and displaying, to the user and in response to the selection, one or more frames of the video corresponding to the location along the path.

14. The computer-implemented method of claim 5 wherein the using of the sequence of images to automatically generate the floor map further includes automatically generating, by the one or more computing devices, a three-dimensional model of the building based at least in part on adding estimated height information for one or more of the multiple rooms to the floor map, wherein the presenting of the floor map further includes displaying a user-selectable control on the floor map to represent the three-dimensional model, and wherein the method further comprises:

receiving information about a selection by a user of the displayed user-selectable control; and presenting, to the user and in response to the selection, at least a portion of the three-dimensional model.

15. The computer-implemented method of claim 5 wherein the presenting of the floor map further includes at least one of:

receiving information about a first user selection of a location on the floor map at which an additional image was captured, and presenting the additional image in response to the first user selection; or receiving information about a second user selection of a location on the floor map with which a textual annotation is associated, and presenting the textual annotation in response to the second user selection; or receiving information about a third user selection of a user-selectable control on the floor map associated with an additional story of the building that is different than a story of the building initially displayed during the presenting of the floor map, and presenting at least some of the floor map for the additional story in response to the third user selection; or presenting information on the floor map that indicates estimated dimensions of one of the multiple rooms, wherein the estimated dimensions are further determined based at least in part on the analyzing of the multiple images in that one room; or presenting information on the floor map that indicates a room type for one of the multiple rooms, wherein the room type is further determined based at least in part on the analyzing of the multiple images in that one room.

16. The computer-implemented method of claim 5 wherein the analyzing of the multiple images for one of the multiple rooms includes generating a three-dimensional point cloud for that one room that includes a plurality of three-dimensional points along walls of that one room, and wherein the method further comprises using the generated three-dimensional point cloud for that one room as part of generating the estimated room shape of that one room.

17. The computer-implemented method of claim 16 wherein the generating of the three-dimensional point cloud for the one room includes using at least one of a Structure-From-Motion analysis or a simultaneous localization and mapping analysis or a multiple-view stereovision analysis, and wherein the using of the generated three-dimensional point cloud for the one room includes using data from the generated three-dimensional point cloud as part of at least one of the detecting of the features of that one room or of the determining of the normal directions for that one room.

18. The computer-implemented method of claim 16 wherein the generating of the three-dimensional point cloud for the one room includes using at least one of a Structure-From-Motion analysis or a simultaneous localization and mapping analysis or a multiple-view stereovision analysis, and wherein the using of the generated three-dimensional point cloud for the one room includes using the combined determined normal directions for that one room to identify portions of the generated three-dimensional point cloud that correspond to each of the walls of that one room.

19. The computer-implemented method of claim 5 wherein the method further comprises generating, for one of the multiple rooms and separately for each of the multiple images in that one room, estimated positions of the walls of that one room using normal directions determined from analysis of that image, and wherein generating of the estimated room shape of that one room further includes projecting pixel data from at least one of the multiple images for that one room onto the estimated positions of the walls of that one room that are determined for at least one other image of the multiple images for that one room, and measuring an amount of reprojection error from the projecting.

20. The computer-implemented method of claim 19 further comprising generating a three-dimensional point cloud for the one room that includes a plurality of three-dimensional points along walls of that one room by using at least one of a Structure-From-Motion analysis or a simultaneous localization and mapping analysis or a multiple-view stereovision analysis, and wherein the generating of the estimated room shape of that one room further includes using the generated three-dimensional point cloud as part of identifying the estimated positions of the walls of the one room.

21. A non-transitory computer-readable medium having stored contents that cause one or more computing devices to perform automated operations including at least:
  obtaining, by the one or more computing devices, a sequence of images taken along a path through multiple rooms of a building, wherein the sequence includes multiple images in each of the multiple rooms;
  using, by the one or more computing devices, the sequence of images to automatically generate a floor map of the building, including:
    determining, by the one or more computing devices, estimated room shapes for the multiple rooms by analyzing the images of the sequence to detect features in the multiple rooms that include connecting passages between rooms and to determine normal directions orthogonal to planes associated with at least some of the detected features, by combining the determined normal directions to identify estimated positions of walls of the multiple rooms, and by connecting the estimated positions of the walls to generate the estimated room shapes for the multiple rooms; and
    arranging, by the one or more computing devices, and to produce the floor map, the estimated room shapes for the multiple rooms relative to each other based at least in part on the connecting passages between rooms; and
  providing, by the one or more computing devices, the floor map of the building for further use.

22. The non-transitory computer-readable medium of claim 21 wherein the providing of the floor map further includes displaying, by the one or more computing devices, the floor map to a user in a graphical user interface.

23. The non-transitory computer-readable medium of claim 21 wherein the stored contents include software instructions that, when executed, program the one or more computing devices to further obtain a continuous video taken by a capture device as it moves along the path, and to select the images of the sequence from a subset of a plurality of frames of the continuous video, and wherein the automatic generating of the floor map is further performed without using any depth information acquired by the capture device to any surrounding objects.

24. The non-transitory computer-readable medium of claim 21 wherein the determining of the estimated room shape for one of the multiple rooms includes generating, using a Structure-From-Motion analysis of the multiple images in that one room, a three-dimensional point cloud for that one room that includes a plurality of three-dimensional points along walls of that one room, and using the generated three-dimensional point cloud for that one room as part of generating the estimated room shape of that one room.

25. The non-transitory computer-readable medium of claim 24 wherein the using of the generated three-dimensional point cloud for the one room includes using data from the generated three-dimensional point cloud as part of at least one of detecting the features of that one room or of determining the normal directions for that one room.

26. The non-transitory computer-readable medium of claim 24 wherein the using of the generated three-dimensional point cloud for the one room includes using the combined determined normal directions for that one room to identify portions of the generated three-dimensional point cloud that correspond to each of the walls of that one room.

27. The non-transitory computer-readable medium of claim 21 wherein the determining of the estimated room shape for one of the multiple rooms further includes determining, separately for each of the multiple images in that one room, estimated positions of the walls of that one room using normal directions determined from analysis of that image, projecting pixel data from at least one of the multiple images for that one room onto the estimated positions of the walls of that one room that are determined for at least one other image of the multiple images for that one room, and measuring an amount of reprojection error from the projecting.

28. The non-transitory computer-readable medium of claim 27 wherein the automated operations further include generating a three-dimensional point cloud for the one room that includes a plurality of three-dimensional points along walls of that one room by using a Structure-From-Motion analysis, and wherein generating of the estimated room shape of that one room further includes using the generated three-dimensional point cloud as part of identifying the estimated positions of the walls of the one room.

29. A system comprising:
  one or more hardware processors of one or more computing devices; and
  one or more memories with stored instructions that, when executed by at least one of the one or more hardware processors, cause at least one of the one or more computing devices to perform automated operations including at least:
    obtaining a group of images that include multiple images taken in each of multiple rooms of a building;
    determining estimated room shapes for the multiple rooms by analyzing the images of the group to detect features in the multiple rooms that include connecting passages between rooms and to determine normal directions orthogonal to planar surfaces associated with at least some of the detected features, by combining the determined normal directions to identify estimated positions of walls of the multiple rooms, and by connecting the estimated positions of the walls to generate the estimated room shapes for the multiple rooms;

arranging, based at least in part on the connecting passages between rooms, the estimated room shapes for the multiple rooms relative to each other to produce a floor map of the building; and providing the floor map of the building to one or more client devices.

30. The system of claim 29 wherein the stored instructions include software instructions that, when executed, program the at least one computing device to further obtain a continuous video taken by a capture device as it moves along a path through the multiple rooms of the building, and to select the images of the group from frames of the continuous video, and wherein the determining of the estimated room shapes is further performed without using any depth information acquired during taking of the continuous video.

31. The system of claim 30 wherein the one or more computing devices include a client device in use by an end user, and wherein the providing of the floor map further includes displaying the floor map to the end user in a graphical user interface on the client device, for use in navigating the building.

\* \* \* \* \*